United States Patent
Donovan et al.

(10) Patent No.: US 11,628,745 B2
(45) Date of Patent: Apr. 18, 2023

(54) APPARATUS FOR A GROUND-BASED BATTERY MANAGEMENT FOR AN ELECTRIC AIRCRAFT

(71) Applicant: BETA AIR, LLC, South Burlington, VT (US)

(72) Inventors: Sean Donovan, Richmond, VT (US); Sarah Kathleen Overfield, Colchester, VT (US); Stuart Denson Schreiber, Essex, VT (US); Peter Adam Gottlieb, Wayland, VT (US); Braedon Lohe, Essex Junction, VT (US); Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/665,454

(22) Filed: Feb. 4, 2022

(65) Prior Publication Data

US 2022/0250508 A1     Aug. 11, 2022

Related U.S. Application Data

(60) Provisional application No. 63/146,154, filed on Feb. 5, 2021.

(51) Int. Cl.
    *B60L 58/26*     (2019.01)
    *B64D 27/24*     (2006.01)
    *B60L 50/64*     (2019.01)

(52) U.S. Cl.
    CPC ............... *B60L 58/26* (2019.02); *B60L 50/64* (2019.02); *B64D 27/24* (2013.01); *B60L 2200/10* (2013.01); *B60L 2240/36* (2013.01)

(58) Field of Classification Search
None
See application file for complete search history.

(56) References Cited

U.S. PATENT DOCUMENTS

| | | |
|---|---|---|
| 4,574,112 A | 3/1986 | Breault et al. |
| 6,641,084 B1 | 11/2003 | Huber et al. |
| (Continued) | | |

FOREIGN PATENT DOCUMENTS

| | | |
|---|---|---|
| CZ | 308366 B6 | 6/2020 |
| DE | 10238235 A1 | 3/2004 |
| (Continued) | | |

OTHER PUBLICATIONS

Onkar Singh & Ragini Singh, Thermodynamic evaluation of SOFC-GT hybrid power and cooling system, Sep. 11, 2019.

(Continued)

*Primary Examiner* — Jared Fureman
*Assistant Examiner* — Joel Barnett
(74) *Attorney, Agent, or Firm* — Caldwell Intellectual Property Law

(57) ABSTRACT

An apparatus for a ground-based battery management for an electric aircraft is presented. The apparatus includes a battery pack mechanically coupled to the electric aircraft, wherein the battery pack includes at least a battery module, wherein each battery module includes at least a battery unit containing a first row of battery cells, a second row of battery cells, and a thermal conduit disposed between the first row and the second row of the battery unit, wherein the thermal conduit is configured to precondition the battery cells. Each battery module includes a thermal circuit mechanically coupled to the thermal conduit configured to facilitate the precondition using thermal media. The apparatus further includes a media channel encompassing the battery pack configured to connect to a ground cooling component that provides the thermal media to the thermal circuit using the thermal circuit, and evacuate the thermal media using the thermal circuit.

20 Claims, 12 Drawing Sheets

(56) References Cited

U.S. PATENT DOCUMENTS

| | | |
|---|---|---|
| 7,291,420 B2 | 11/2007 | Bitsche et al. |
| 7,380,749 B2 | 6/2008 | Fucke et al. |
| 8,418,365 B2 | 4/2013 | German et al. |
| 9,077,056 B2 | 7/2015 | Marchio et al. |
| 9,118,093 B2 | 8/2015 | Boettcher et al. |
| 9,350,002 B2 | 5/2016 | Fuhr et al. |
| 2002/0177035 A1 | 11/2002 | Oweis et al. |
| 2005/0170240 A1 | 8/2005 | German et al. |
| 2006/0029849 A1 | 2/2006 | Metzler |
| 2007/0037050 A1 | 2/2007 | Rigobert et al. |
| 2007/0158500 A1 | 7/2007 | Sridhar et al. |
| 2010/0261046 A1 | 10/2010 | German et al. |
| 2013/0264134 A1* | 10/2013 | Matsuda ............ B62M 7/04 180/68.1 |
| 2015/0042158 A1* | 2/2015 | Schmidt ............ H01M 50/20 429/96 |
| 2017/0194678 A1* | 7/2017 | Yang ............ H01M 10/6556 |
| 2018/0141675 A1 | 5/2018 | Halsey et al. |
| 2020/0339010 A1* | 10/2020 | Villanueva ........ H01M 10/6568 |

FOREIGN PATENT DOCUMENTS

| | | |
|---|---|---|
| DE | 102009035473 A1 | 2/2011 |
| EP | 2355204 A1 | 8/2011 |
| WO | 2007115743 | 10/2007 |
| WO | 2009129012 | 10/2009 |
| WO | 2012069417 | 5/2012 |

OTHER PUBLICATIONS

Azizi, M. A., & Brouwer, J., Progress in solid oxide fuel cell-gas turbine hybrid power systems: System design and analysis, transient operation, controls and optimization, May 29, 2018.

Collins, J. M., & McLarty, D., All-electric commercial aviation with solid oxide fuel cell-gas turbine-battery hybrids, Aug. 10, 2020.

* cited by examiner

_US 11,628,745 B2_

APPARATUS FOR A GROUND-BASED BATTERY MANAGEMENT FOR AN ELECTRIC AIRCRAFT

CROSS-REFERENCE TO RELATED APPLICATIONS

This application claims the benefit of priority of U.S. Provisional Patent Application Ser. No. 63/146,154 filed on Feb. 5, 2021, and entitled "GROUND-BASED THERMAL MANAGEMENT ASSEMBLY FOR AN ELECTRIC AIRCRAFT," which is incorporated by reference herein in its entirety.

FIELD OF THE INVENTION

The present invention generally relates to the field of battery management. In particular, the present invention is directed to an apparatus for a ground-based battery management for an electric aircraft.

BACKGROUND

In electric multi-propulsion systems of aircrafts (e.g. electric vertical take-off and landing (eVTOL) aircrafts), energy-dense battery packs are utilized in powering these aircrafts. Fast charging of these energy-dense battery packs can generate a significant amount of heat which can have critical failure effects on the battery pack and surrounding aircraft components. Electric aircraft require very high specific energy storage systems that can recharge quickly between flights. Currently available lithium ion battery cells require thermal management for safety as well as to extend the usable life of the battery pack. Existing systems and methods for mitigating the excess heat often require coolant, compressors, fans, pumps, etc., which increase aircraft weight and reduce range of the aircraft.

SUMMARY OF THE DISCLOSURE

In an aspect, an apparatus for a ground-based battery management for an electric aircraft is presented. The apparatus includes a battery pack mechanically coupled to the electric aircraft, wherein the battery pack includes at least a battery module, wherein each battery module includes at least a battery unit containing a first row of battery cells, a second row of battery cells, and a thermal conduit disposed between the first row and the second row of the battery unit, wherein the thermal conduit is configured to precondition the battery cells. Each battery module includes a thermal circuit mechanically coupled to the thermal conduit configured to facilitate the precondition of the battery cells using thermal media. The apparatus further includes a media channel encompassing the battery pack, wherein the media channel is configured to connect to a ground cooling component, providing the thermal media to the thermal circuit using the thermal circuit, and evacuate the thermal media out of the battery pack using the thermal circuit.

In another aspect, a method of ground-based battery management for an electric aircraft is presented. The method includes connecting, by a media channel encompassing a battery pack, to a ground cooling component, wherein the ground cooling component is configured to provide thermal media, preconditioning, by a thermal conduit disposed between a first row and a second row of battery cells, the battery cells using the thermal media, facilitating, by a thermal circuit mechanically coupled to the thermal conduit, the precondition of the battery cells, and evacuating, by the media channel, the thermal media out of the battery pack.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
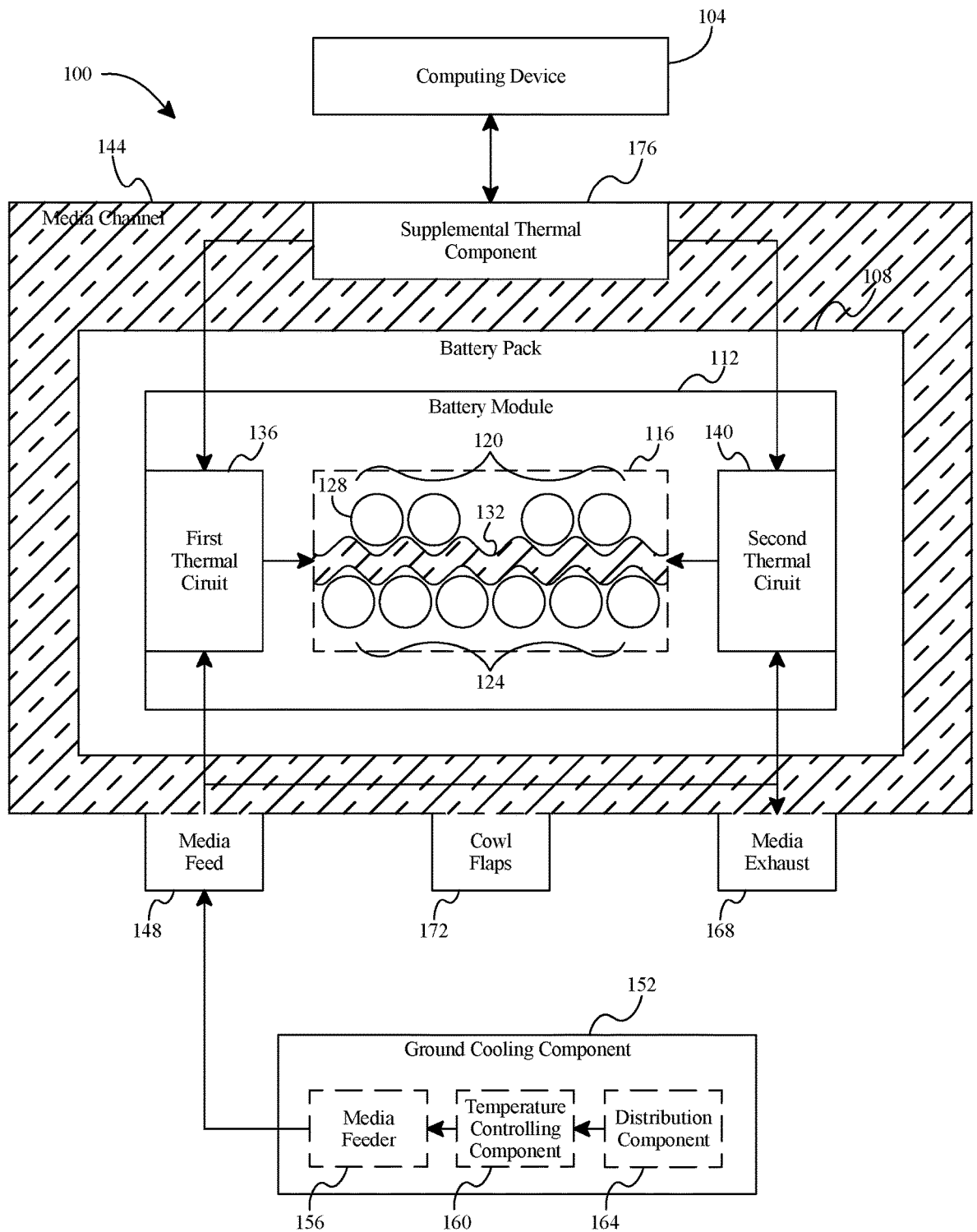
FIG. 1 is a block diagram of an exemplary embodiment of an apparatus for ground-based battery management for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus a method of ground-based battery management for an electric aircraft. In an embodiment, the apparatus includes a battery pack containing a plurality of modules. Each module houses a plurality of battery cells in battery units. The battery unit includes two rows of battery cells and a thermal conduit disposed in between them and directly the two rows. In an embodiment, the thermal conduit includes a flexible surface, establishing direct contact with a portion of the surface area around a portion of the circumference of each battery cell wherein heat transfer may take place. Aspects of the present disclosure can include a thermal circuit configured to provide the necessary media to allow for the heat transfer to take place. This is so, at least in part, for the thermal conduit to precondition the battery cells of the electric aircraft and facilitate the precondition of the battery cells.

In an embodiment, the battery management apparatus may precondition the battery pack of an electric aircraft by facilitating the flow of media while the electric aircraft is on the ground, wherein the flow of media is to cool the battery pack and its batteries. In this way, a fast-deployable assembly to remove heat from the battery pack during ground-based recharging is achieved. Aspects of the present disclosure can incorporate a ground-based cooling component where the media for cooling is provided from. In an embodiment, the apparatus may include mechanisms to connect to the ground-based cooling component. In some embodiments, the ground-based cooling component may be integrated with the electric aircraft. In another embodiment, the apparatus may facilitate the flow of media, wherein the battery pack needs to be heated for certain operations. The apparatus may enable an electric aircraft battery module to maintain a sufficient temperature during recharging, wherein the sufficient temperate allows the electric aircraft to begin a flight missing immediately after battery charging is complete. In an embodiment, the apparatus may be integrated in an electric vehicle, such as electric aircraft.

Aspects of the present disclosure can also be used to precondition the battery pack of an electric aircraft during flight. In an embodiment, the apparatus may include a supplemental cooling component designed to provide the media and facilitate the flow of media for the precondition of the battery pack prior to or following the landing of the electric aircraft. The supplemental cooling component can be used as a temporary storage for media to be used to facilitate the flow of media within the battery pack.

Aspects of the present disclosure can also be used to contain high temperature media. In an embodiment, the apparatus includes a media channel encompassing the battery pack. The media channel is a hollow passage for which the media can be circulated in and out of the battery pack. Aspects of the present disclosure can include an exhaust to expel battery eject and excess media out of the body of the electric aircraft and the battery pack. In another embodiment, the apparatus may include cowl flaps incorporated onto the media channel and/or the exterior of the battery pack and electric aircraft to circulate outside airflow into the media channel and facilitate the flow of media inside and out of the electric aircraft and battery pack. This is so, at least in part, if the battery pack needs to be preconditioned during flight, the cowl flaps can be activated to open and expose the media channel for outside air to enter for airflow circulation and expel high temperature media out. In another embodiment, the supplemental cooling component that may be used to store excess media may reach its maximum capacity in which it must evacuate the excess media. The cowl flaps may allow for the excess media to evacuate the battery pack and the electric aircraft.

Aspects of the present disclosure can also include measures to detect media discharge or leaks. In an embodiment, a sensor such as a pressure transducer connected to the media channel and/or media feed to measure media input from the ground-based cooling component. This is so, at least in part, to determine if some corrective measure needs to be taken to address and/or compensate for such media discharge or leaks. For example, the media channel may receive less than required media due to some mechanical fault of the apparatus. The apparatus may be configured to enable the cowl flaps during flight to compensate for the fault and precondition the battery cells using outside airflow.

Aspects of the present disclosure can incorporate a computing device communicatively connected to the electric aircraft. In an embodiment, a pilot of the electric aircraft may govern the preconditioning and functions of the apparatus. In another embodiment, the computing device may enable the pilot to perform any corrective measures in various situations.

Referring now to FIG. 1, an exemplary embodiment of an apparatus 100 for a ground-based battery management for an electric aircraft is illustrated. Apparatus 100 includes a computing device 104. In a non-limiting embodiment, computing device 104 may include a flight controller. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. In a non-limiting embodiment, computing device 104 may be operated and/or utilized by a pilot of an electric aircraft communicatively connected to computing device 104.

As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

With continued reference to FIG. 1, apparatus 100 is incorporated into an electric aircraft. An "electric aircraft," as used in this disclosure, is an electric vehicle manned by a pilot that may fly by gaining support from the air. In a non-limiting embodiment, the electric aircraft may include an electric vertical take-off and landing (eVTOL) aircraft. Apparatus 100 may be integrated as a component of the electric aircraft, such as the electric aircraft's energy storage system. An "energy storage system," is a component and/or portion of an electric aircraft used to house the power source of the electric aircraft. The ground-based battery management of apparatus 100 may include a battery pack 108. A "battery pack," as used in this disclosure, is an energy storage device containing at least a battery module used to power an electric aircraft and its components; a battery pack may include a plurality of battery modules. For instance and without limitation, battery pack 108 may be consistent with the battery pack in U.S. patent application Ser. No. 17/529,447, filed on Nov. 18, 2021, and entitled, "MODULE MONITOR UNIT FOR AN ELECTRIC AIRCRAFT BATTERY PACK AND METHODS OF USE," which is incorporated by reference in its entirety herein. Apparatus 100 may include a plurality of battery packs configured in parallel and/or series combinations. The plurality of battery packs may be stocked side by side and wired together. Each battery pack 108 may include a plurality of battery modules. A "battery module," as used in this disclosure is an energy storage device containing a plurality of battery cells in a fixed position. For instance and without limitation, battery module 112 may be consistent with the battery module in U.S. patent application Ser. No. 17/529,447. In a non-limiting embodiment, battery module 112 may also be consistent with the battery module in U.S. application Ser. No. 17/404,500 and entitled, "STACK BATTERY PACK FOR ELECTRIC VERTICAL TAKE-OFF AND LANDING AIRCRAFT," which is incorporated by reference herein in its entirety. Persons skilled in the art, upon reviewing the entirety of this disclosure, will be aware of the configurations of battery packs and battery modules in the context of electric vehicles.

With continued reference to FIG. 1, battery module 112 may include a plurality of battery cells 128 organized into at least a battery unit. A "battery unit," as used in this disclosure, is a group of energy storage devices stored in a battery module. A "battery cell" as described herein, is a single anode and cathode separated by electrolyte, wherein the cell produces voltage and current. For instance and without limitation, battery cell 128 may include a pouch cell. For instance and without limitation, the pouch cell may be consistent with the pouch cell in U.S. patent application Ser. No. 17/362,389, filed on Jun. 29, 2021, and entitled, "SYSTEM FOR A POUCH CELL CASING CONFIGURED FOR USE IN AN ELECTRIC AIRCRAFT," which is incorporated by reference in its entirety herein. In a non-limiting embodiment, battery cell 128 may have a shape, such as a cylinder, and may include a radius. Battery cells 128 may include a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells 128 may include lead-based batteries such as without limitation lead acid batteries and lead carbon batteries. Battery cells may include lithium sulfur batteries, magnesium ion batteries, and/or sodium ion batteries. Battery cells 128 may include solid state batteries or supercapacitors or another suitable energy source. In another non-limiting embodiment, battery cell 128 can include an electrochemical reaction configured to produce electrical energy. For example and without limitation, the electrical energy produced by battery cell 128 may be sufficient to power at least a portion of an electric aircraft. In another non-limiting example, battery cell 128 may include a primary battery or a secondary battery. Each battery cell of the plurality of battery cells may include electrochemical cells, galvanic cells, electrolytic cells, fuel cells, flow cells, voltaic cells, and/or any combination thereof. The electrolyte of battery cell 128 may include any material, such as a liquid electrolyte or a paste electrolyte. For example and without limitation, the electrolyte of battery cell 128 may include molten salt or ammonium chloride. As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other. Persons skilled in the art, upon reviewing the entirety of this disclosure, will be aware of various devices of components that may be used as a battery cell.

In a non-limiting embodiment, and still referring to FIG. 1, a plurality of battery cells may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells may use the term 'wired', but one of ordinary skill in the art would appreciate that this term is synonymous with 'electrically connected', and that there are many ways to couple electrical elements like battery cells together. As an example, battery cells can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in any arrangement which may confer onto the system the electrical advantages associated with that arrangement such as high-voltage applications, high-current applications, or the like. Persons skilled in the art, upon reviewing the entirety of this disclosure, will be aware of the various embodiments and configuration of battery cells for purposes as described herein.

With continued reference to FIG. 1, battery unit 116 includes a first row 120 of battery cells and a second row 124 of battery cells. A "row" as used in this disclosure, is a group of battery cells organized into a singular line of battery cells. Battery unit 116 also includes a thermal conduit 132 disposed between first row 120 of battery cells and second row 124 of battery cells. A "thermal conduit," as used in this disclosure, is a thermally conductive component separating each row of battery cells within a respective battery unit and transfer heat. In a non-limiting embodiment, thermal conduit 132 may contain conductive material embedded in a plurality of sheets, layers, and/or casing. Thermal conduit 132 may be configured to directly touch and/or contact with first row 120 of battery cells and second row 124 of battery cells, wherein a portion of the surface area of the cylindrical side of battery cell 128 is in direct contact with a surface of thermal conduit 132. Thermal conduit 132 may include a flat surface. Thermal conduit 132 may include a flexible surface. In a non-limiting embodiment, thermal conduit 132 may be configured to establish direct contact with the portion of the cylindrical side of battery cell 128 by wrapping around that portion of battery cell 128. Thermal circuit 132 may include two surfaces opposed to one another. A first opposing surface of thermal conduit 132 may face first row 120 of battery cells. The first opposing surface may be configured to directly contact and/or touch a portion of each battery cell 128 of first row 120. A second opposing surface may be configured to directly contact and/or touch a portion of each battery cell 128 of second row 124. Persons skilled in the art, upon reviewing the entirety of this disclosure, will be aware the configuration and organization of a thermal conduit and battery cells in the context of heat transfer within a battery unit.

In a non-limiting embodiment, and still referring to FIG. 1, thermal conduit 132 may include a passageway for thermal media to traverse through. For example and without limitation, the shape of thermal conduit 132 may include an elongated rectangular and/or tube-like device in which a hollow passageway is present inside thermal conduit 132. Inside thermal conduit 132 may include a plurality of passageways, openings, and/or lumens for which thermal media may traverse through. The passageways may be divided by walls and/or columns stretching from one inner surface of thermal conduit 132 to the other inner surface for structural support purposes. Persons skilled in the art, upon reviewing the entirety of this disclosure, will be aware of the various embodiments, shapes, and/or structures for a heat transfer device in the context of battery management.

With continued reference to FIG. 1, thermal conduit 132 may be composed of any suitable material. For example and without limitation, thermal conduit 132 may be composed of any thermally conductive material, such as a metal. In an embodiment, thermal conduit 132 may be composed utilizing aluminum. In a non-limiting embodiment, thermal conduit 132 may be composed utilizing a plurality of manufacturing processes, such as extrusion, casting, subtractive manufacturing processes, and the like. In another non-limiting embodiment, thermal conduit 132 may be composed utilizing injection molding. Injection molding may comprise injecting a liquid material into a mold and letting the liquid material solidify, taking the shape of the mold in a hardened form, the liquid material may include liquid crystal polymer, polypropylene, polycarbonate, acrylonitrile butadiene styrene, polyethylene, nylon, polystyrene, polyether ether ketone, and the like, and/or any combination thereof. The thermal conduit may be configured to cool the plurality of battery cells of the respective battery unit 116, wherein the battery cells are cooled by allowing a thermal media to flow though thermal conduit 132.

With continued reference to FIG. 1, thermal conduit 132 is configured to precondition the battery cells. "Precondition," as used in this disclosure, is a process of heat transfer between the battery cells and thermal conduit 132 for the purpose of cooling and/or heating the battery cells. The precondition may be used to prepare the electric aircraft and batter pack 108 for future flights. The precondition may be used to optimize the efficiency of recharging battery pack 108. In a non-limiting embodiment, each portion of flight of an electric aircraft, such as a take-off, climb, cruise, hover, land, and the like thereof, may require various intensities of power consumption. For example and without limitation, there is a high power demand for stages such as take-off and climb followed by a low power demand during high efficiency cruise flight, and finally a possible high power demand upon descend and landing. Thermal conduit 132 may serve as a catalyst for preconditioning the battery cells to optimize the efficiency of power consumption, health, and life cycle of the battery cells of an electric aircraft. For example and without limitation, thermal conduit 132 may be configured to transfer heat using thermal media provided to it. The thermal media may travel across the length of thermal conduit 132 and transfer heat out of battery cell 128 and cool it. This is so, at least in part, to reduce the overall temperature of battery cell 128 and mitigate burnout and/or thermal runaway events of battery cell 128. In a non-limiting embodiment, thermal conduit 132 may transfer heat into battery cell 128 based on the precondition. For example and without limitation, high power demand stages may optimize power consumption by preconditioning the battery cells such as heating them prior to the high power demand stages. Prior to take-off thermal conduit 132 may precondition battery cell 128 by transferring high temperature thermal media into battery cell 128. Alternatively or additionally, thermal conduit 132 may cool battery cell 128 with low temperature thermal media to mitigate battery degradation. Persons skilled in the art, upon reviewing the entirety of this disclosure, will be aware of the various embodiments of preconditioning a power source of an electric aircraft for purposes as described herein.

With continued reference to FIG. 1, "thermal media," as used in this disclosure, is any fluid and/or gas that may transfer the heat generated by each battery cell of each battery unit out of battery pack 108 and an electric aircraft. Alternatively or additionally, thermal media may include any fluid and/or gas that may transfer heat into each battery cell of each battery unit. In a non-limiting embodiment, the thermal media may include a fluid, such as water, heat-transfer oil, molten salt, and the like. In some embodiments, thermal media may pass, flow, and/or be pumped through thermal conduit 132 and its one or more passageways, openings, and/or lumens. In another non-limiting embodiment, the thermal media may include a gas, such as air, steam, compressed air, and the like. Persons skilled in the art, upon reviewing the entirety of this disclosure, will be aware of various fluids and/or gases that may be used as the media consistently with this disclosure. Further, persons skilled in the art, upon reviewing the entirety of this disclosure, will be aware of various thermally conductive components that may be used as the thermal conduit consistently with this disclosure.

With continued reference to FIG. 1, thermal conduit 132 is mechanically coupled to a thermal circuit. A "thermal circuit," as used in this disclosure is an electrical and/or heat transfer device capable of providing temperature controlled supply of thermal media to a thermal conduit of a plurality of thermal conduits. "Mechanically coupled," as used in this disclosure, is a mechanical connection established by one or more mechanical mechanisms. In some embodiments, a thermal circuit may include a plurality of ports and/or terminals configured to mate with one end of thermal conduit 132 of a plurality of thermal conduits. In a non-limiting embodiment, a thermal circuit may be separate from battery pack 108. In another embodiment, a thermal circuit may be hollow. A thermal circuit may receive thermal media from an outside source and facilitate the precondition of the battery cells of each battery unit 116 by facilitating the flow of thermal media within the thermal circuit and thermal conduit 132. For example and without limitation, a thermal circuit may utilize electrical current to power the circulation of thermal media and/or air throughout the thermal circuit and thermal conduit 132. In some embodiments, the facilitation and/or circulation of thermal media and/or air may be controlled by computing device 104. In another embodiment, a thermal conduit may include a plurality of ports and/or terminals configured to connect to a plurality of thermal conduits, wherein each port and/or terminal can connect to the one or more passageways within a thermal conduit. Persons skilled in the art, upon reviewing the entirety of this disclosure, will be aware of the various connecting mechanisms and embodiments for purposes as described herein.

In a non-limiting embodiment, and still referring to FIG. 1, the thermal circuit may include a plurality of thermal circuits fluidically and/or physically coupled to each end of thermal conduit 132 of a plurality of thermal conduits from a plurality of battery units. For instance, a first thermal circuit 136 may be mechanically coupled to a first end of thermal conduit 132 and a second thermal circuit 140 may be mechanically coupled to an opposite second end of thermal conduit 132. Each end of thermal circuit may be configured to connect to both ends of the one or more passageways, openings, and/or lumens in thermal conduit 132. A "first thermal circuit," as used in this disclosure, is any thermal circuit configured to provide temperature controlled supply of thermal media to a thermal conduit from one end of the thermal conduit such as a first end. A "second thermal circuit," as used in this disclosure, is any thermal circuit configured to provide temperature controlled supply of thermal media to a thermal conduit from opposite from first thermal circuit 136 from an opposing second end. In a non-limiting embodiment, first thermal circuit 136 and second thermal circuit 140 may work in tandem to facilitate the precondition of battery cells 128 through their respective ends of thermal conduit 132. For example and without limitation, each thermal circuit may facilitate the precondition of battery cells 128 by minimizing a temperature gradient across each battery cell 128. A "temperature gradient," as used in this disclosure, is the rate of change of temperature with displacement in a given direction through a thermal conduit. In a non-limiting embodiment, battery module 112 may include a plurality of battery units such as battery unit 116 stacked on top of each other. As the difference in height of each battery unit 116 may affect the temperature and/or heat transfer of the battery cells 128 of each battery unit, first thermal circuit 136 and/or second thermal circuit 140 may work in tandem with each other to precondition each battery cell 128 to reach the same temperature above some temperature threshold. This may include intensifying the facilitation and/or circulation of thermal media through battery units and their thermal conduits of battery units closer to the top of the stack. In another non-limiting embodiment, thermal media may flow from both ends of thermal conduit 132 and converge in the center. Thermal conduit 132 may achieve equilibrium of thermal media and in turn, equally precondition each battery cell 128 from first row 120 and second row 140 across the length of the rows, battery unit 116 and/or thermal conduit 132. In some embodiment, the management and/or minimizing of the temperature gradient may be controlled by computing device 104 and/or the pilot utilizing computing device 104. Persons skilled in the art, upon reviewing the entirety of this disclosure, will be aware of the various embodiments of utilizing the plurality of thermal conduits in the context of battery management.

Alternatively or additionally, either of first thermal circuit 136 and or second thermal circuit 140 may be configured to receive thermal media from thermal conduit to be expelled out of battery pack 108. In a non-limiting embodiment, second thermal circuit 140 may be mechanically coupled to media exhaust 168 and receive thermal media provided from first thermal circuit 136 and thorough thermal conduit 132, for instance and without limitation through passages and/or lumens thereof, and/or from openings of such passages and/or lumens. This may be so, at least in part, to provide a passageway for a flow of thermal media used to cool battery cells 128 and/or soak their heat and expelled out of battery pack 108. Persons skilled in the art, upon reviewing the entirety of this disclosure, will be aware of the various embodiments of heat transfer for purposes as described herein.

With continued reference to FIG. 1, apparatus 100 may include a media channel 144 encompassing battery pack 108. A "media channel," as used in this disclosure, is a passageway for ventilation and for temperature-based media to travel through. Media channel 144 may enable the circulation of thermal media and/or air around battery pack 108. In a non-limiting embodiment, media channel 144 may include a vent conduit A "vent conduit," as used in this disclosure, is a passage allowing ejecta, thermal media, and/or other material to exit from a device. For the purposes of this disclosure "fluidly connected" means that fluid is able to flow from one of the fluidly connected elements to the other, notwithstanding any elements that temporarily or optionally restrict fluid flow, such as, as non-limiting examples, a check valve or a pressure disk. For instance and without limitation, the vent conduit may be consistent with the vent conduit in U.S. patent application Ser. No. 17/563,331, and entitled, "SYSTEM FOR ELECTRIC AIRCRAFT BATTERY VENTING USING A VENT CONDUIT," which is incorporated by reference herein in its entirety. Media channel 144 may include a media feed 148. A "media feed," as used in this disclosure, is an opening and/or port used to connect to a ground-based cooling component. In a non-limiting embodiment, media feed 148 may include a vent conduit mechanically coupled to each thermal circuit for which thermal media may be provided through. For example and without limitation, media feed 148 may receive thermal media from ground cooling component 168. Media feed 148 and/or media channel 144 may provide the thermal media from ground cooling component 152 directly to each thermal circuit. In some embodiments, media feed 148 may include a valve. The valve may enable for singular flow of thermal media to optimize the efficiency of thermal media flow. Persons skilled in the art, upon reviewing the entirety of this disclosure, will be aware of the various embodiments a media feed may be used to receive a temperature-based media for purposes as described herein.

With continued reference to FIG. 1, media channel 144 may include a media exhaust 168. A "media exhaust," as used in this disclosure, is a ventilation opening and/or port used to evacuate temperature-based media, excess media, and/or any unwanted media originating from battery cells out of media channel 144, battery pack 108 and/or an electric aircraft. In a non-limiting embodiment, media exhaust 168 may include a vent port. A "vent port" as used in this disclosure, is an opening and/or aperture configured to allow temperature-based media, ejecta, and/or other objects out of media channel 144 and/or battery pack 108. In an embodiment, a vent port may be configured to vent excess thermal media from battery cells 128. Alternatively or additionally, media exhaust 168 and/or vent port may include a check valve. As used in this disclosure, a "check valve" is a valve that permits flow of an excess media in a single direction. For example and without limitation, a check valve may be configured to allow flow of thermal media and/or excess media out of the body of the electric aircraft and battery pack 108 while preventing back flow of vented media back into battery pack 108.

In a non-limiting embodiment, and still referring to FIG. 1, a check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent port 108 may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. Persons skilled in the art, upon reviewing the entirety of this disclosure, will be aware of a single direction valve in the context of ventilation and/or filtration.

With continued reference to FIG. 1, media exhaust 168 may be connected to a vent outlet. A "vent outlet," as used in this disclosure, is an opening through which material carried by a vent conduit and/or media channel can exit a device. In a non-limiting embodiment, a vent outlet may have any cross-sectional shape configured to allow battery ejecta and other fluids to move from media channel 144 and/or a vent port towards the vent outlet. The cross section of the vent conduit may be circular, rectangular, trapezoidal, elliptical, triangular, irregular, square, and the like. A person of ordinary skill in the art would, after reviewing the entirety of this disclosure, appreciate that a wide variety of cross-section shapes are possible.

With continued reference to FIG. 1, media exhaust 168 may be configured to recirculate airflow from outside air into media channel 144. For example and without limitation, electric aircraft may require some preconditioning of is batteries midflight in which media exhaust 168 may allow outside air to enter into media channel 144 and cool battery cells 128. In another non-limiting example, media channel 144 may be overcrowded with thermal media, excess media, and/or any ejecta from battery cells 128 during the preconditioning of the battery cells 128 in which ventilation is necessary. Media exhaust 168 may enable such ventilation and evacuation of overcrowded objects and/or materials within media channel 144. In a non-limiting embodiment, media channel 144 may include cowl flaps 172. "Cowl flaps," as used in this disclosure, are small doors located around the body of an electric aircraft, battery pack, and/or media channel, used to allow for greater cooling during operations of the electric aircraft. For example and without limitation, when opened, cowl flaps 172 increase the flow of cooling air through the cowling by increasing the size of the cowling outlet. In a non-limiting embodiment, cowl flaps 172 may be controlled by a pilot and/or computing device 104 utilized by the pilot. For example and without limitation, during cruise, descent, and/or landing, cowl flaps 172 may be closed to optimize electric aircraft and/or power consumption efficiency. Persons skilled in the art, upon reviewing the entirety of this disclosure, will be aware of various cooling devices in the context of battery management.

With continued reference to FIG. 1, apparatus 100 may receive the thermal media required for the preconditioning and/or facilitation of the precondition of battery cells 128 from a ground cooling component 152. A "ground cooling component," as used in this disclosure, is a ground-based device used to provide the temperature-based media used to precondition an electric aircraft. In a non-limiting embodiment, media channel 144 may receive the thermal media to feed into first thermal circuit 136 and/or second thermal circuit 140 by connecting to a ground cooling component 152. In another non-limiting embodiment, media feed 148 may form a connection using some locking mechanism with ground cooling component 152 to securely receive thermal media from it. Ground cooling component 152 may be in any location such that it may be coupled to battery pack 108 and/or an electric aircraft when the aircraft is not in flight, such as when the aircraft is grounded, taxiing, parked, and the like. For example and without limitation, the location may include on the ground, on a platform, any raised structure, coupled to a recharging pad infrastructure, and the like. Persons skilled in the art, upon reviewing the entirety of this disclosure, will be aware of various locations that may be used location of the thermal management apparatus consistently with this disclosure.

With continued reference to FIG. 1, ground cooling component may include a media feeder 156. A "media feeder" as used in this disclosure, is a component that mechanically couples to media feed 148 of media channel 144, wherein mechanically coupling creates an open passage for thermal media to transport into media feed 148, media channe1144, and/or battery module 120. Media feeder 156 may be configured to connect to media feed 148 in the event the electric aircraft is grounded prior to transporting thermal media. For example and without limitation, media feeder 156 may provide thermal media when the electric aircraft is not in flight, such as when taxiing, recharging, parked, and the like. In some embodiments, media feeder may include any tubing, piping, hose, and/or any other hollow component capable of facilitating the transport of thermal media. Alternatively or additionally, media feeder 156 may be incorporated into a charging connector in which the charging connecter may recharge battery pack 108 of an electric aircraft following the transfer of thermal media. For instance and without limitation, the charging connector may be consistent with the charging connector in, U.S. patent application Ser. No. 17/562,082, and entitled, "METHODS AND SYSTEMS FOR AUTHENTICATION OF AN ELECTRIC AIRCRAFT FOR RECHARGING," which is incorporated by reference herein in its entirety. Persons skilled in the art, upon reviewing the entirety of this disclosure, will be aware of various components that may be used as the media feeder consistently with this disclosure.

With continued reference to FIG. 1, ground cooling component 152 may include a temperature controlling component 160. A "temperature controlling component", as used in this disclosure, is a component that is capable of raising and/or lowering the temperature of thermal media. For example and without limitation, temperature controlling component 136 may include a heater, cooler, thermolater, a temperature control unit, chiller, and/or the like. Temperature controlling component 160 may be configured to adjust thermal media to a temperature that will efficiently cool battery pack 108 including plurality of battery cells 128. In an embodiment, temperature controlling component 160 may be mechanically coupled to media feeder 156. Further, in an embodiment, once thermal media reaches a threshold temperature, the media will be transported to battery module 112 and its thermal circuits through media feeder 132. Persons skilled in the art, upon reviewing the entirety of this disclosure, will be aware of various components that may be used as the temperature controlling component consistently with this disclosure.

With continued reference to FIG. 1, ground cooling component 152 may include a distribution component 164. A "distribution component", as used in this disclosure, is a component that intakes the media into ground cooling component 152. For example and without limitation, distribution component 164 may include a compressor, a fan, a pump, and/or the like. In an embodiment, distribution component 164 may be mechanically coupled to ground cooling component 152. In a further embodiment, distribution component 164 may be configured to supply thermal media to battery pack 108, wherein distribution component 164 is configured to transfer thermal media to temperature controlling component 160. Persons skilled in the art, upon reviewing the entirety of this disclosure, will be aware of various components that may be used as the distribution component consistently with this disclosure.

In a non-limiting embodiment, apparatus 100 may include a supplemental thermal component 176. A "supplemental thermal component," as used in this disclosure, is a thermal media providing device used as a temporary source of thermal media to be used for the precondition of battery cells during flight. In a non-limiting embodiment, supplemental thermal component 176 may be separate and located in media channel 144. In another non-limiting embodiment, supplemental thermal component 176 may be mechanically coupled to media channel 144 and/or each thermal circuit such as first thermal circuit 136 and second thermal circuit 176. In some embodiments, supplemental thermal component 176 may be similar to ground cooling component 152. In a non-limiting example, in the event an electric aircraft is in the air and requires preconditioning of its battery cells prior to landing, supplemental thermal component 176 may be enabled to provide thermal media to each thermal circuit to facilitate the precondition. For example and without limitation, as an electric aircraft descends towards the ground, the electric aircraft may require high demand in power consumption in which cooling of battery cells 128 may be required as a part of the precondition. Supplemental thermal component 176 may provide the thermal media necessary to achieve the requirements of the precondition. In some cases, supplemental thermal component 176, media exhaust, and/or cowl flaps 172 may work in tandem to facilitate the precondition and/or achieve a desired temperature for battery cells 128. Persons skilled in the art, upon reviewing the entirety of this disclosure, will be aware of the various battery management measures in the context of midflight preconditioning.

With continued reference to FIG. 1, apparatus 100 may be configured to perform a thermal media discharge check. A "thermal media discharge check," as used in this disclosure, is a protocol and/or test used to identify any leaks, mechanical faults, and/or unexpected discharge of thermal media flow in the process of transferring thermal media into battery modules. For example and without limitation, thermal media leakage and/or discharge may be present at media feed 148 and/or media channel 144 as a function of degraded materials, unsecure connections, and the like thereof. In a non-limiting embodiment, apparatus 100 may include a sensor. A "sensor," as used in this disclosure, is an electronic device configured to detect, capture, measure, or combination thereof, a plurality of external qualities. In a non-limiting embodiment, the sensor may include a pressure transducer. A "pressure transducer," as used in this disclosure, is a transducer used to convert pressure into an electrical signal. In a non-limiting embodiment, the pressure transducer may be located at media feed 148, media channel 144, and/or a thermal circuit. The pressure transducer may measure pressure related data as thermal media is flowing from ground cooling component 152, supplemental cooling component 176, flowing through media feed 148 and/or 144, and/or into a thermal circuit and/or thermal conduit 132. In a non-limiting embodiment, the pressure transducer may be communicatively connected to computing device 104 wherein the electrical signals converted by the pressure transducer is used for analysis by computing device 104. For example and without limitation, a thermal media discharge check may include measuring and/or detecting any leaks, discharge, pressure related data, and/or battery related data by the pressure transducer and transmitting the data to computing device 104. For example and without limitation, as thermal media is being transferred into electric aircraft to cool battery cells 128, computing device 104 and/or the pressure transducer may detect short bursts of temperature decrease indicating a leak of thermal media. For instance and without limitation, the measuring and detecting of data and phenomenon for the purpose of precondition may be consistent with the preconditioning and/or pre-charging of batteries in U.S. patent application Ser. No. 17/407,518, filed on Aug. 20, 2021, and entitled, "SYSTEM AND METHOD FOR COMMUNICATING A PRE-CHARGING PACKAGE STREAM OF AN ELECTRIC AIRCRAFT," which is incorporated by reference herein in its entirety.

In another non-limiting example, the usual amount and/or time to cool the battery cells 128 of an electric aircraft to a specific temperature may not be reached, indicating some failure, leak, and/or discharge within apparatus 100. Computing device 104 may determine if a corrective measure must be undertaken by assessing the electrical signal of data received from the pressure transducer by some precondition threshold. A "precondition threshold," as used in this disclosure, is a minimum and/or maximum value that must be reached for an electric aircraft to continue its planned operations and/or missions following its preconditioning. For example and without limitation, if the precondition threshold is not reached, computing device 104 concludes that the electric aircraft and its batteries are not preconditioned to its expected values, in which some determinative action must be undertaken to identify the source of the failed precondition and/or resolve it. In a non-limiting embodiment, the thermal media discharge check may be conducted while the electric aircraft is not in flight, grounded, and the like thereof. Persons skilled in the art, upon reviewing the entirety of this disclosure, will be aware of the various embodiments and devices used to test for leaks, faults, and the like thereof, for purposes as described herein.

With continued reference to FIG. 1, apparatus 100 may be configured to execute a discharge precondition corrective action as a function of the thermal media discharge check. A "discharge precondition corrective action," as used in this disclosure is an action conducted by an electric aircraft and/or computing device 104 to mitigate a loss of thermal media and/or maintain the flow of thermal media for preconditioning purposes. For example and without limitation, the discharge precondition corrective action may include opening cowl flaps 172 with wider gaps to allow for more airflow to be circulated into the media channel 144 and/or expel excess heat emitting from the battery cells 128 during an electric aircraft's flight following the thermal media discharge check. In another non-limiting example, the discharge precondition corrective action may include enabling supplemental cooling component 176 to provide additional thermal media to compensate for a leakage and/or discharge. Persons skilled in the art, upon reviewing the entirety of this disclosure, will be aware of the various corrective and mitigating actions in the context of battery management.

Figure 2:
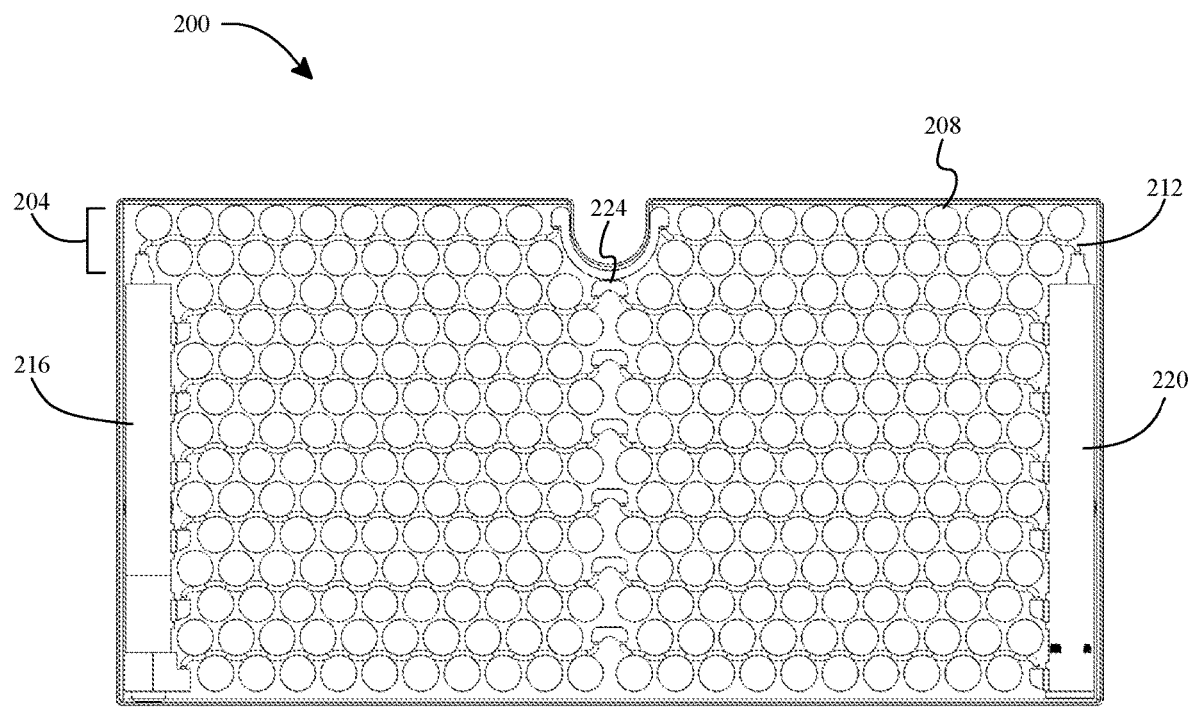
FIG. 2 is an illustration of an exemplary embodiment of a battery module.

Now referring to FIG. 2, an exemplary embodiment of a battery module 200 is illustrated. In a non-limiting embodiment, battery module 200 may be consistent with any battery module as described in the entirety of this disclosure. Battery module 200 is configured to facilitate the flow of a thermal media through the thermal conduit 212 to cool and/or heat battery module 200. Thermal conduit 212 may be consistent with any thermal conduit as described herein. Battery module 200 can include one or more battery units 204. Battery unit 204 may be consistent with any battery unit as described herein. In a non-limiting embodiment, battery module 200 may house and/or encase at least a portion of each battery unit 204. In a non-limiting embodiment, battery units 204 may be configured to be contained within the battery module 200, wherein each battery unit is disposed in any configuration without limitation. As an exemplary embodiment, FIG. 2 illustrates battery units 204 housed within battery module 200 stacked on top of each other and/or next to each other. Persons skilled in the art, upon reviewing the entirety of this disclosure, will be aware of the various configurations of battery units as described herein.

With continued reference to FIG. 2, each battery unit 204 may be configured to provide power to at least a portion of an electric aircraft and can include one or more battery cells 208. Battery cell 208 may include any battery cell as described herein. According to embodiments, each battery cell 208 may be effectively parallel relative to one another. In the embodiment of FIG. 2, one or more battery cells 208 are in contact with a first side of thermal conduit 212. In a non-limiting embodiment, battery cells 208 may have a shape, such as a cylinder, and may include a radius. Each battery cell 208 can comprise an electrochemical reaction configured to produce electrical energy. For example and without limitation, the electrical energy produced by one or more battery cells 208 may be sufficient to power at least a portion of an electric aircraft, such as an eVTOL aircraft. Each battery cell 208 may comprise a primary battery or a secondary battery. Each battery cell 208 may include electrochemical cells, galvanic cells, electrolytic cells, fuel cells, flow cells, voltaic cells, and/or any combination thereof. The electrolyte of each battery cell 208 may include any material, such as a liquid electrolyte or a paste electrolyte. For example and without limitation, the electrolyte of each battery cell 208 may include molten salt or ammonium chloride. In some embodiments, thermal conduit 212 may be able to expand and compress. Thermal conduit 212 may be configured to corrugate around a portion of battery cells 208 as shown in FIG. 2. "Corrugation," as used in this disclosure, is act of enveloping a ridge or groove of a surface of a cylindrical side of battery cell 208. Thermal conduit 212 may include flexible properties enabling thermal conduit to alternatively corrugate around battery cells 208 of first row and second row of battery cells as shown in FIG. 2. Persons skilled in the art, upon reviewing the entirety of this disclosure, will be aware of various cells that may be used as the plurality of battery cells consistently with this disclosure.

With continued reference to FIG. 2, battery cells 208 may be arranged in any configuration. In embodiments, each battery unit 204 may contain any number of battery cells 208 arranged in any number rows and any number of columns. For example and without limitation, a battery unit 204 may include nine rows of battery cells and two columns as shown in FIG. 2, wherein the two columns are separated by a column of conduit connectors 224. A "conduit connector," as used in this disclosure, is any device and/or connecter used to connect thermal conduits together and located at the midpoint of the conjoined thermal conduits. In a non-limiting embodiment, conduit connector 224 may be used as a reference point for which an equilibrium of thermal media flow is achieved. In some embodiments, battery unit 204 may include six rows of battery cells and four columns so that there are 24 total battery cells 208 within battery unit 204. Though the illustrated embodiments of FIG. 2 present one arrangement for battery units 204, one of skill in the art will understand that any number of arrangements may be used.

With continued reference to FIG. 2, each battery cell 208 of a respective battery unit 204 may be electrically connected, wherein the electrical connection may be in series, parallel, and/or any combination thereof. In the entirety of this disclosure, the term 'wired' may be appreciated by a person of ordinary skill in the art to be synchronous with 'electrically connected'. Further, a person or ordinary skill in the art would understand that there are many ways to couple electrical elements together and any of the means to couple electrical elements may be used to electrically couple battery cells 208 of a respective battery unit 204. Battery cells 208 that are connected in series may include, for example and without limitation, wiring a first terminal of a first battery cell to a second terminal of a second battery cell and further configured to comprise a single conductive path for electricity to flow while maintaining the same current (measured in Amperes) through any component in the circuit. As a further example and without limitation, battery cells 208 connected in parallel may include wiring a first and second terminal of a first battery cell to a first and second terminal of a second battery cell and further configured to comprise more than one conductive path for electricity to flow while maintaining the same voltage (measured in Volts) across any component in the circuit. As another non-limiting example, battery cells 208 may be wired in a series-parallel circuit, wherein the characteristics of a series circuit and the characteristics of a parallel circuit are combined. Further, as a non-limiting example, battery cells 208 may be electrically connected in an arrangement, wherein the arrangement provides an electrical advantage, such as high-voltage application, high-current applications, and the like. Persons skilled in the art, upon reviewing the entirety of this disclosure, will be aware of various arrangements of battery cells that may be used as the configuration of the plurality of battery cells consistently with this disclosure.

Still referring to FIG. 2, each battery unit 208 may include a respective thermal conduit 212. In embodiments, thermal conduit 212 can include a first surface and a second opposite, opposing surface with a thickness between the first and second surfaces as describe herein. In a non-limiting embodiment, thermal conduit 212 can include a first and second opposite, opposing ends. Thermal conduit 212 may include a thermally conductive component separating each column of battery cells 208 within a respective battery unit 204. Thermal conduit 212 may be configured to include a first end and a second end, wherein the second end is opposite the first end of thermal conduit 212. For example and without limitation, in the illustrated embodiment of FIG. 2, thermal conduit 212 is disposed such that it separates the two columns of battery cells 208 within a battery unit 204, each column contains ten battery cells. According to embodiments, thermal conduit 212 may have a height that is equal to or less than the height of one or more battery cells 208. In embodiments, thermal conduit 212 may be composed of any suitable material. In an embodiment, thermal conduit 212 may be composed utilizing aluminum. For example and without limitation, thermal conduit 212 may be composed utilizing a plurality of manufacturing processes, such as extrusion, casting, subtractive manufacturing processes, and the like. As a further non-limiting example, thermal conduit 212 may be composed utilizing injection molding. Injection molding may comprise injecting a liquid material into a mold and letting the liquid material solidify, taking the shape of the mold in a hardened form, the liquid material may include liquid crystal polymer, polypropylene, polycarbonate, acrylonitrile butadiene styrene, polyethylene, nylon, polystyrene, polyether ether ketone, and the like, and/or any combination thereof.

With continued reference to FIG. 2, thermal conduit 212 may be configured to facilitate the flow of thermal media, wherein the flow of the media cools the plurality of battery cells 208. By facilitating the flow of thermal media through at least a passage of thermal conduit 212, thermal conduit 212 can be configured to cool battery module 200. In a non-limiting example, one or more passages may be configured to facilitate the flow of a gas, wherein the gas is configured to cool battery module 200, such that the heat generated by battery module is stripped away. For example and without limitation, thermal conduit 212 can include a heat spreader, such that the thermal conduit transfers heat generated by mattery module 200 out of the system. In embodiments, thermal conduit 212 may be disposed in a battery unit 204 such that thermal conduit 212 separates each battery cell 208 within the battery unit 204. In a non-limiting embodiment, by separating each battery cell 208 within a battery unit 204, thermal conduit 212 is configured to allow the thermal media to flow in between each battery cell 208 in the battery unit 204. In embodiments, the thermal media is generated by a ground cooling component and transmitted to battery module 200, wherein the media is transmitted when the media feeder of the ground cooling component is coupled to a media feed of a thermal circuit. In embodiments, the media feeder of the ground cooling component is configured to transfer the thermal media to the media feed of the thermal circuit as a function of the media feeder coupling to the thermal circuit of battery module 200. For example and without limitation, the thermal media may include any thermal media as described in further detail in the entirety of this disclosure. In embodiments, thermal conduit 212 may be configured to couple to at least a portion of a thermal circuit. In further embodiments, thermal conduit 212 may be configured to couple to at least a portion of first thermal circuit 216 and a portion of second thermal circuit 220. Further, in embodiments, thermal conduit 212 may be configured to couple to at least a portion of battery module 200. For example, thermal conduit 212 may be configured to couple to a first side, second side, and/or any combination thereof of battery module 200. Coupling may include a mechanical fastening, without limitation, such as nuts, bolts, other fastening devices, and/or any combination thereof. Coupling may further include welding, casting, and/or the like. Persons skilled in the art, upon reviewing the entirety of this disclosure, will be aware of various means of joining that may be used coupling consistently with this disclosure.

With continued reference to FIG. 2, battery module 200 is configured to include first thermal circuit 216. In a non-limiting embodiment, first thermal circuit 216 is configured to couple to thermal conduit 212 of each battery unit 204. Further, in an embodiment, first thermal circuit 216 is configured to couple to the first end of thermal conduit 212, wherein the media is configured to flow from first thermal circuit 216 to the first end of thermal conduit 212 through the at least a passage of thermal conduit 212. Coupling may include any coupling as described in further detail throughout the entirety of this disclosure. In a non-limiting embodiment, first thermal circuit 216 may include any component configured to facilitate the flow of thermal media to a battery pack by utilizing an electrical current. Further, first thermal circuit 216 may include any component configured to facilitate the flow of media out of the battery pack by utilizing an electrical current. In a non-limiting embodiment, first thermal circuit 216, for example and without limitation, may include any component configured to recirculate the flow of thermal media through the battery pack by utilizing an electrical current and any component configured to exhaust the thermal media from the battery pack by utilizing electrical current. For example and without limitation, first thermal circuit 216 may include a printed circuit board, wherein the printed circuit board mechanically supports the electrical connection facilitating the flow of media to the battery pack. Further, first thermal circuit 216, without limitation, may include any circuit as described in further detail in the entirety of this disclosure. In a non-limiting embodiment, first thermal circuit 216 is configured to include a first end and a second end, wherein the second end is opposite the first end of first thermal circuit 216. For example and without limitation, in the illustrated embodiment of FIG. 2, the first end of first thermal circuit 216 is in a plane perpendicular to the longitudinal axis of battery cells 208 and perpendicular to the longitudinal axis of thermal conduit 212. The first end of first thermal circuit 216 is configured to include the media feed component. The media feed component of first thermal circuit 216 is configured to allow the thermal media to feed into battery module 200 and/or the battery pack, wherein the flow of thermal media is initiated as a function of coupling the media feed component of first thermal circuit 216 to the media feeder of the thermal management apparatus. The "media feed component" as used in this disclosure, is a component configured to facilitate the entry of the thermal media from external the battery pack to inside first thermal circuit 216 of battery module 200 as a function of the media feeder coupling to the media feed component. For example and without limitation, the media feed component may include a threaded component, a magnetic component, a latching mechanism, a pressure fit tubing mechanism, a nozzle mechanism, a hole, a flap, and the like. Persons skilled in the art, upon reviewing the entirety of this disclosure, will be aware of various components that may be used as the media feed component of the circuit consistently with this disclosure.

Still referring to FIG. 2, battery module 200 may be further configured to include second thermal circuit 220. Second thermal circuit 220 is configured to couple to thermal conduit 212 of each battery unit 204. Further, in an embodiment, second thermal circuit 220 is configured to couple to the second end of thermal conduit 212, wherein the media is configured to flow from the second end of thermal conduit 212 to second thermal circuit 220 through the at least a passage of thermal conduit 212. Coupling may include any coupling as described in further detail throughout the entirety of this disclosure. Second thermal circuit 220 may include any component configured to facilitate the flow of thermal media out of the battery pack by utilizing an electrical current. Further, second thermal circuit 220 may include any component configured to facilitate the flow of thermal media to the battery pack by utilizing an electrical current. Second thermal circuit 220, for example and without limitation, may include any component configured to recirculate the flow of thermal media through the battery pack by utilizing an electrical current and/or any component configured to exhaust thermal media from battery pack by utilizing electrical current. In an embodiment, for example and without limitation, any number of second circuits 220 may be employed in the instant embodiment. For example and without limitation, second thermal circuit 220 may include a printed circuit board, wherein the printed circuit board mechanically supports the electrical connection facilitating the flow of thermal media out of the battery pack. Further, second thermal circuit 220, without limitation, may include any circuit as described in further detail in the entirety of this disclosure. Second thermal circuit 220 is configured to include a first end and a second end, wherein the second end is opposite the first end of second thermal circuit 220. For example and without limitation, in the illustrated embodiment of FIG. 2, the first end of second thermal circuit 220 is in a plane perpendicular to the longitudinal axis of battery cells 208 and perpendicular to the longitudinal axis of thermal conduit 212.

Figure 3:
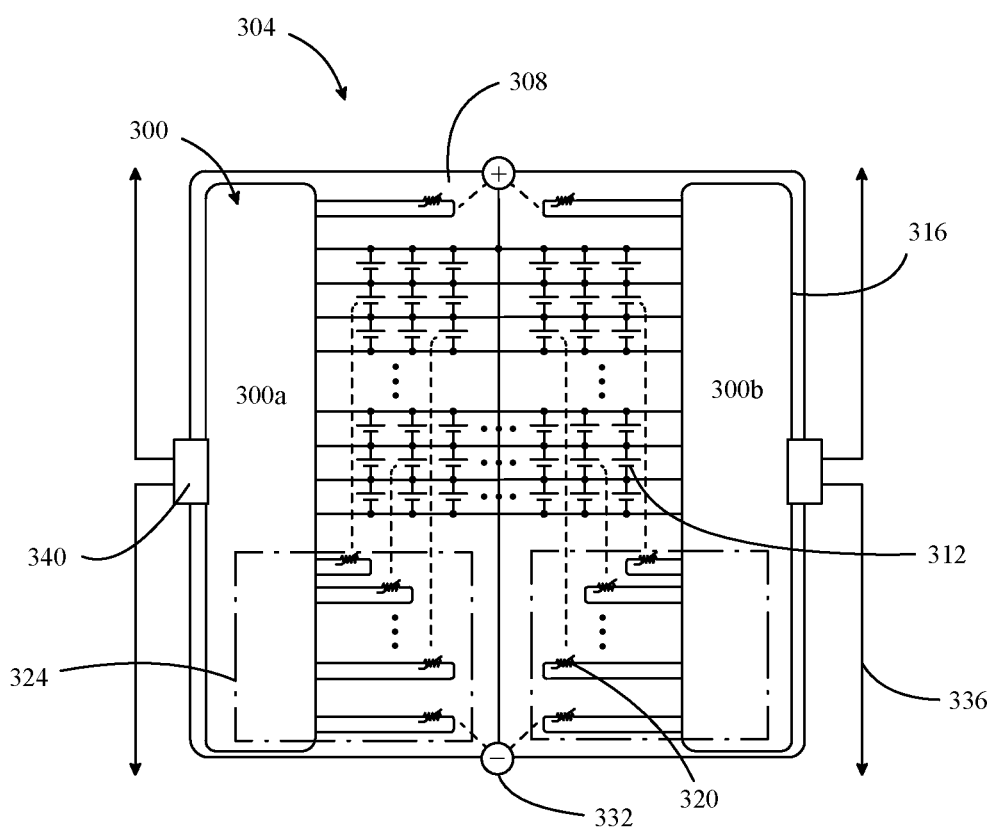
FIG. 3 is a block diagram of an exemplary embodiment of a module monitor unit.

Referring now to FIG. 3, an exemplary embodiment of a module monitor unit (MMU) 300 is presented in accordance with one or more embodiments of the present disclosure. MMU 300 may be consistent with any MMU as described in the entirety of this disclosure such as, but not limited to, MMU 104. In one or more embodiments, MMU 300 is configured to monitor an operating condition of a battery pack 304. For example, and without limitation, MMU 300 may monitor an operating condition of a battery module 308 and/or a battery cell 312 of battery pack 304. For instance and without limitation, battery module 308 may be consistent with any battery module as described herein such as, but not limited to, battery module 108. In one or more embodiments, MMU 300 may be attached to battery module 308, as shown in FIG. 3. For example, and without limitation, MMU 300 may include a housing 316 that is attached to battery module 308, where circuit of MMU 300 may be disposed at least partially therein, as discussed further in this disclosure. In one or more embodiments, a housing may include a polymer, stainless steel, carbon steel, fiberglass, and polycarbonate. In other embodiments, MMU 300 may be remote to battery module 308.

In one or more embodiments, and still referring to FIG. 3, a plurality of MMUs 300 may be configured to monitor battery module 308 and/or battery cell 312. For instance, and without limitation, a first MMU 300a may be position at one end of battery module 308, and a second MMU 300b may be positioned at an opposing end of battery module 308. This arrangement may allow for redundancy in monitoring of battery cell 312. For example, and without limitation, if first MMU 300a fails, then second MMU 300b may continue to work properly and monitor the operating condition of each battery cell 312 of battery module 308. In one or more embodiments, MMU 300 may monitor the operating condition of a plurality of battery cells, as shown in FIG. 3.

In one or more embodiments, and still referring to FIG. 3, MMU 300 is configured to detect a measurement parameter of battery module 308. For the purposes of this disclosure, a "measurement parameter" is detected electrical or physical input, characteristic, and/or phenomenon related to a state of battery pack 304 and/or components thereof. For example, and without limitation, a measurement parameter may be a temperature, a voltage, a current, a moisture level/humidity, a gas level, or the like, as discussed further in this disclosure. In one or more embodiments, MMU 300 may be configured to perform cell balancing and/or load sharing during the charging of battery pack 304. Cell balancing may be used when a battery module includes a plurality of battery cells 312. Cell unbalance includes variances in charge and discharge of each battery cell depending on an operating condition of each battery cell 312. Cell unbalance may result in damage, such as degradation or premature charge termination, of a battery cell. For example, a battery cell with a higher SOC than other battery cells may be exposed to overvoltage during charging. Cell balancing may include compensating for a variance in SOC, internal impedance, total chemical capacity, or the like. For instance, MMU 300 may perform cell balancing for SOC and thus regulate voltage input of battery cells 312. For instance, and without limitation, charging of battery pack 304 may be shared throughout a plurality of battery cells 312 by directing electrical power through balance resistors and dissipating voltage through resistors as heat. For example, and without limitation, resistor may include a nonlinear resistor, such as a thermistor 320. Thermistor 320 may be configured to provide cell balancing by reducing a voltage supplied to a battery cell of the battery module. The reduction in the voltage supplied to the battery cell may be achieved via heat dissipation. In one or more non-limiting embodiments, MMU 300 may detect the charge of each battery and thermistors 320 of MMU 300 may be configured to reduce a current and/or voltage supplied to a battery cell 312 as a function of a temperature of the thermistor. For example, and without limitation, if a battery cell is being overcharged then the temperature of the connected circuit and thermistor may also experience and increase in temperature; as a result the thermistor may increase in resistance and a fraction of the supplied voltage across the thermistor will also change, which results in a decrease in voltage received by the battery cell. In this manner, battery cells 312 may be charged evenly during recharging and/or charging of battery pack 304 by, for example, a charging station or an electric grid. For example, and without limitation, battery cells with a lower SOC will charge more than battery cells with a greater SOC by thermistors 320 dissipating voltage to the battery cells with the greater SOC. In one or more embodiments, cell balancing may be equally distributed, where each battery cell receives an equal amount of electricity depending on how many amps are available from the charger and how many cells need to be charged. For example, and without limitation, a current may be equally distributed to each battery cell by MMU 300. In another embodiment, MMU 300 may detect an SOC of each battery cell and distribute current to each battery cell in various amounts as a function of the detected SOC of each battery cell. For example, and without limitation, MMU may detect that a first battery cell has an SOC of 30% and a second battery cell has as SOC of 80%. During recharging, the current and/or voltage to the first battery may be increased so that first battery cell is charged faster than the second battery cell. In one or more non-limiting embodiments, once first battery cell is at the same SOC as the second battery cell during recharging, distribution of current and/or voltage to each battery cell may be adjusted again so that the first battery cell and the second battery cell receive an equal charge.

With continued reference to FIG. 3, in a non-limiting embodiment, MMU 300 is configured to monitor a temperature of battery module 308. For example, MMU 300 may include a sensor 324 configured to detect a temperature parameter of battery cell 312. Sensor 324 may be consistent with any senor as described in the entirety of this disclosure. For example, and without limitation, sensor 324 may include thermistor 320, which may be used to measure a temperature parameter of battery cell 312. As used in this disclosure, a thermistor includes a resistor having a resistance dependent on temperature. In one or more embodiments, sensor 324 may include circuitry configured to generate an MMU datum correlated to the detected measurement parameter, such as a temperature of battery cell 312 detected by thermistor 320. An "MMU datum," as used in this disclosure, is a collection of information describing the measurement parameters of battery cell 312. In a non-limiting embodiment, MMU 300a and MMU 300b may generate their respective MMU datums. This is so, at least in part, to compare the MMU datum measured by MMU 300a and the MMU datum measured by MMU 300b. In a non-limiting embodiment, the comparison may indicate one or more discrepancies related to the measurement parameters which may further indicate some thermal event. A thermistor may include metallic oxides, epoxy, glass, and the like. A thermistor may include a negative temperature coefficient (NTC) or a positive temperature coefficient (PTC). Thermistors may be beneficial do to being durable, compact, inexpensive, and relatively accurate. In one or more embodiments, a plurality of thermistors 320 may be used to provide redundant measuring of a state of battery cell 312, such as temperature. In other embodiments, MMU 300 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 320 may detect a temperature of battery cell 312. Subsequently, MMU 300 may generate a sensor signal output containing information related to the detected temperature of battery cell 312. In one or more embodiments, sensor signal output may include the MMU datum containing information representing a detected measurement parameter.

Still referring to FIG. 3, sensor 324 may include a sensor suite 300 (shown in FIG. 3) or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 324 may be a contact or a non-contact sensor. For example, and without limitation, sensor 324 may be connected to battery module 308 and/or battery cell 312. In other embodiments, sensor 324 may be remote to battery module and/or battery cell 312. Sensor 324 may be communicatively connected to controller 320 of PMU 312 (shown in FIG. 3) so that sensor 324 may transmit/receive signals to/from controller 320, respectively, as discussed below in this disclosure. Signals, such as signals of sensor 324 and controller 320, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

In one or more embodiments, and still referring to FIG. 3, MMU 300 may include a control circuit that processes the received MMU datum from sensor 324, MMU 100a, and/or MMU 100b. In one or more embodiments, control circuit may be configured to perform and/or direct any actions performed by MMU 300 and/or any other component and/or element described in this disclosure. Control circuit may include any analog or digital control circuit, including without limitation a combinational and/or synchronous logic circuit, a processor, microprocessor, microcontroller, any combination thereof, or the like. In one or more embodiments, control circuit may be solely constructed from hardware; thus, control circuit may perform without using software. Not relying on software may increase durability and speed of control circuit while reducing costs. For example, and without limitations, control circuit may include logic gates and/or thermistors, as discussed further in this disclosure. In some embodiments, control circuit 328 may be integrated into MMU 300, as shown in FIG. 3. In other embodiments, control circuit 328 may be remote to MMU 300. In one or more nonlimiting exemplary embodiments, if the MMU datum of a temperature of a battery module 308, such as at a terminal 332, is higher than a predetermined threshold, control circuit 328 may determine that the temperature of battery cell 312 indicates a critical event and thus is malfunctioning. For example, a high voltage (HV) electrical connection of battery module terminal 332 may be short circuiting. If control circuit 328 determines that a HV electrical connection is malfunctioning, control circuit 328 may terminate a physical and/or electrical communication of the HV electrical connection to prevent a dangerous or detrimental reaction, such as a short, that may result in an electrical shock, damage to battery pack 304, or even a fire. Thus, control circuit 328 may trip a circuit of battery pack 304 and terminate power flow through the faulty battery module 308 until the detected fault is corrected and/or the excessively high temperature is no longer detected. Temperature sensors, such as thermistor 320 may assist in the monitoring of a cell group's overall temperature, an individual battery cell's temperature, and/or battery module's temperature, as just described above.

In one or more embodiments, and still referring to FIG. 3, MMU 300 may not use software. For example, MMU 300 may not use software to improve reliability and durability of MMU 300. Rather, MMU 300 may be communicatively connected to a remote computing device, such as computing device 800 of FIG. 8. In one or more embodiments, MMU 300 may include one or more circuits and/or circuit elements, including without limitation a printed circuit board component, aligned with a first side of battery module 308 and the openings correlating to battery cells 312. In one or more embodiments, MMU 300 may be communicatively connected to a remote processing module, such as a controller. Controller may be configured to perform appropriate processing of detected temperature characteristics by sensor 324. In one or more embodiments, controller  may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 308**. In these and other embodiments, controller may operate in conjunction with other components, such as, a memory component, where a memory component includes a volatile memory and/or a non-volatile memory.

In one or more embodiments, and still referring to FIG. 3, each MMU 300 may communicate with another MMU 300 and/or a controller via a communicative connection 336. Each MMU may use a wireless and/or wired connection to communicated with each other. For example, and without limitation, MMU 300*a* may communicate with an adjacent MMU 300*a* using an isoSPI connection 304. As understood by one skilled in the art, and isoSPI connection may include a transformer to magnetically connect and electrically isolate a signal between communicating devices. Persons skilled in the art, upon reviewing the entirety of this disclosure, will be aware of the various embodiments of communication in the context of sensors.

Figure 4:
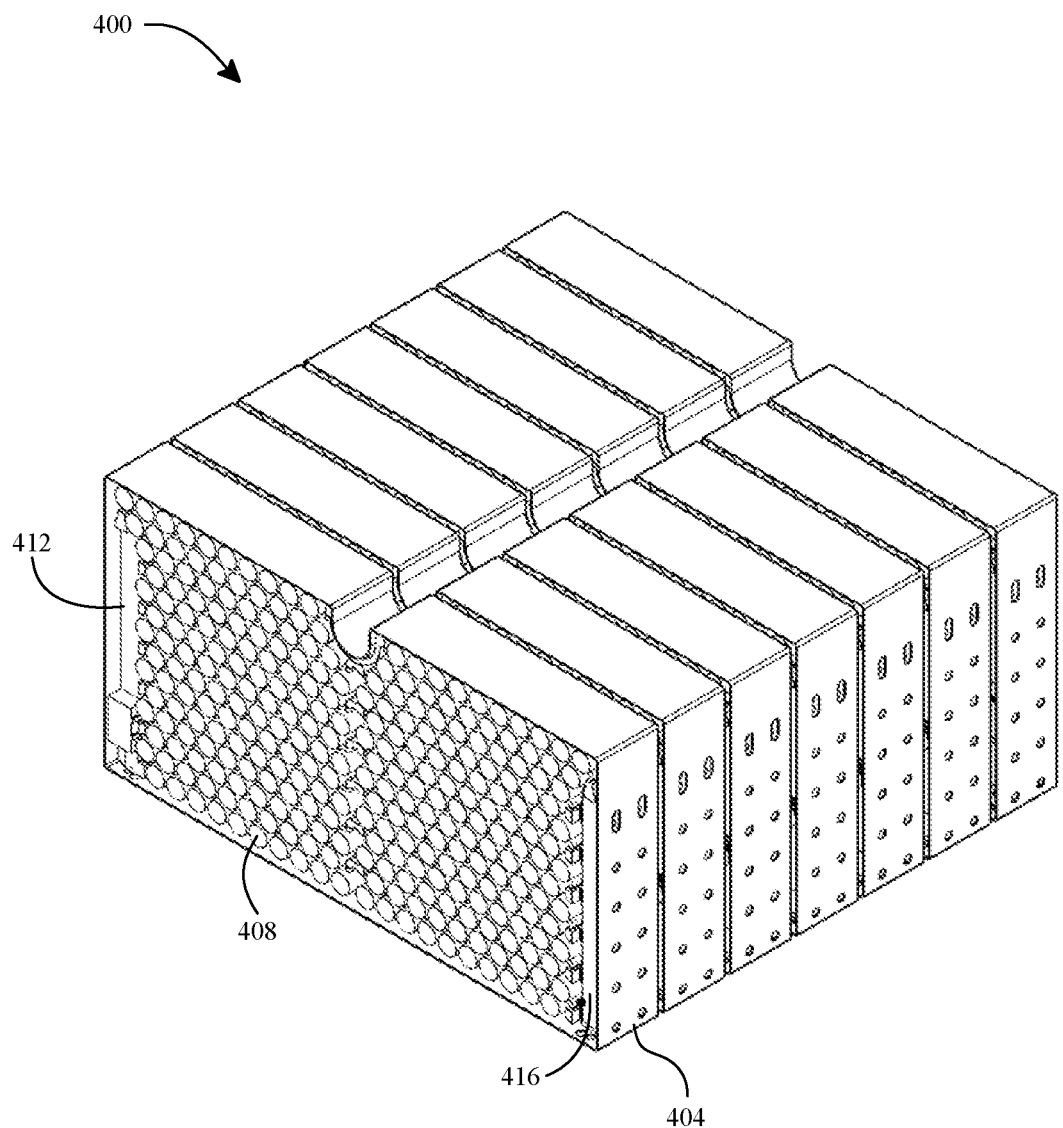
FIG. 4 is an illustration of an exemplary embodiment of a battery pack.

Referring now to FIG. 4, an exemplary embodiment of a battery pack 400 with a plurality of battery modules 404 is illustrated. Battery pack 400 may be consistent with any battery pack as described herein. Battery module 404 may be consistent with any battery module as described herein. In a non-limiting embodiment, Battery pack 400 may be configured to facilitate the flow of thermal media through each battery module 400 of the plurality of battery modules to cool battery pack 400. Battery pack 400 can include one or more battery modules 404. Battery pack 400 may be configured to house and/or encase one or more battery modules. As an exemplary embodiment, FIG. 4 illustrates 7 battery modules 404 creating battery pack 400. In an embodiment, each battery module 400 of the plurality of battery modules can include one or more battery cells 408. Each battery module 404 may be configured to house and/or encase one or more battery cells 308. Each battery cell of the plurality of battery cells 408 may include any battery cell as described in further detail in the entirety of this disclosure. Battery cells 408 may be configured to be contained within each battery module 404, wherein each battery cell 408 is disposed in any configuration without limitation. As an exemplary embodiment, FIG. 4 illustrates 240 battery cells 408 housed within each battery module 404, however, a person of ordinary skill in the art would understand that any number of battery units 408 may be housed within each battery module 404 of battery pack 400. Further, each battery module of the plurality of battery modules 404 of battery pack 400 includes first thermal circuit 412. First thermal circuit 412 may include any circuit as described in further detail in the entirety of this disclosure. Each battery module of the plurality of battery modules 304 further includes second thermal circuit 416. Second thermal circuit 416 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

Figure 5:
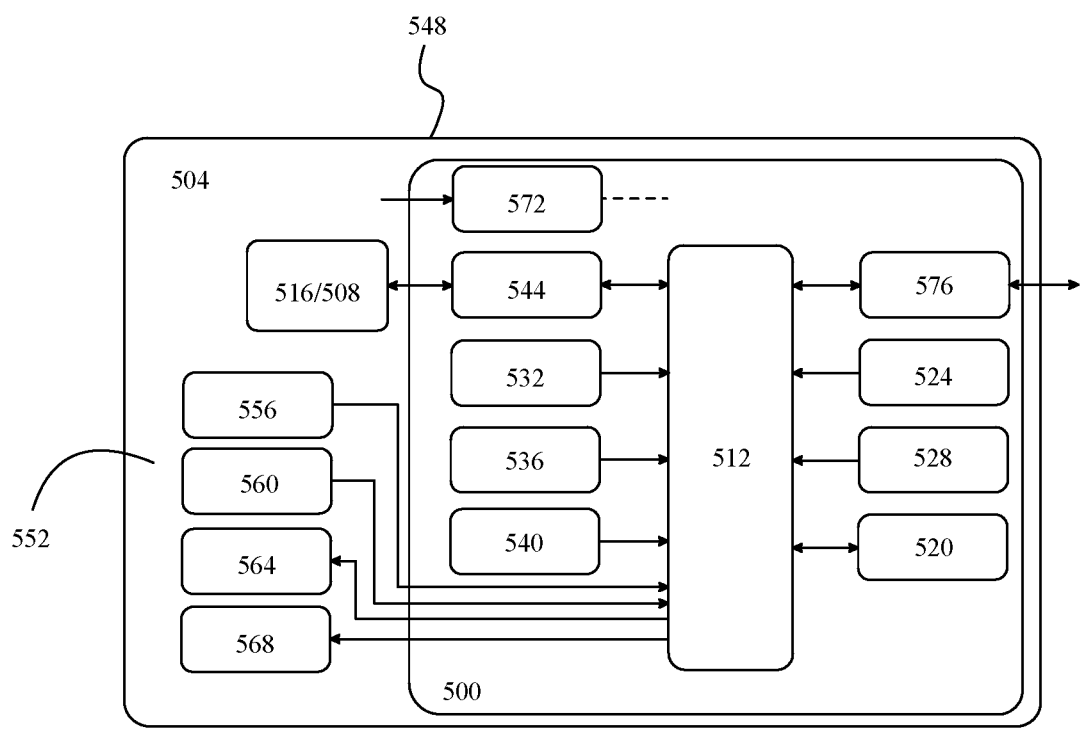
FIG. 5 is a block diagram of an exemplary embodiment of a battery pack.

Referring now to FIG. 5, an exemplary embodiment of a pack monitoring unit (PMU) 500 is shown in accordance with one or more embodiments of the present disclosure. In one or more embodiments, PMU 500 may be implemented in a battery management system (shown in FIG. 3) to monitor a battery pack 504 and/or components of battery pack 504. In one or more embodiments, PMU 500 may receive a condition parameter from a sensor that is configured to detect a condition parameter of battery pack 504. In one or more embodiments, PMU 500 may include a sensor. In other embodiments, sensor may be remote to PMU 500, for example and without limitation, a sensor of a module monitor unit (MMU) 516. As used in this disclosure, a "condition parameter" is a detected electrical or physical input, characteristic, and/or phenomenon related to a state of a battery pack. For example, and without limitation, sensor 508 may measure a condition parameter, such as temperature, of a battery module terminal and/or a battery cell of battery pack 504. A condition parameter may include a temperature, a voltage, a current, a pressure, a gas level, a moisture/humidity level, an orientation, or the like, of battery pack 504 and/or a component of battery pack 504.

In one or more embodiments, condition parameter of battery module 504 may be detected by sensor 508, which may be communicatively connected to an MMU 516 that is incorporated in a battery module, as discussed further below in this disclosure. Sensor 508 may include a sensor suite 500 (shown in FIG. 5) or one or more individual sensors (shown in FIG. 5), which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, bolometers, and the like. Sensor 508 may be a contact or a non-contact sensor. For example, and without limitation, sensor 508 may be connected to battery module and/or battery cell of battery pack 504. In other embodiments, sensor 508 may be remote to battery module and/or battery cell.

Still referring to FIG. 5, sensor 508 may generate a measurement datum, which is a function of a detected condition parameter. For the purposes of this disclosure, "measurement datum" is an electronic signal representing an information and/or a parameter of a detected electrical and/or physical characteristic and/or phenomenon correlated with a state of a battery pack. For example, and without limitation, a sensor signal output includes a measurement datum. In one or more embodiments, measurement datum may include data of a condition parameter regarding a detected state of a battery cell. In one or more embodiments, measurement datum may include a quantitative and/or numerical value representing a temperature, pressure, moisture level, gas level, orientation, or the like. For example, and without limitation, a measurement datum may include a temperature of 75° F. In one or more embodiments, sensor 508 is configured to transmit measurement datum to PMU 500. PMU 500 is configured to receive measurement datum and process the received measurement datum. Though sensor 508 is described as providing one or more sensors, PMU 500 may also include a sensor that detects a parameter condition of battery pack 504 and generates a measurement datum to transmit to controller 512. For example, PMU 500 may include a pressure sensor 524, a real time clock (RTC) sensor 528 that is used to track the current time and date, a humidity sensor 532, an accelerometer/IMU 536, or other sensor 540.

Still referring to FIG. 5, PMU 500 includes a controller 512. Sensor 508 may be communicatively connected to controller 512 of PMU 500 so that sensor 508 may transmit/receive signals to/from controller 512. Signals, such as signals of sensor 508 and/or controller 512, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, controller 512 is configured to receive measurement datum from sensor 508. For example, PMU 500a may receive a plurality of measurement data from MMU 516a (shown in FIG. 5). Similarly, PMU 500b may receive a plurality of measurement data from MMU 516b (shown in FIG. 5). In one or more embodiments, PMU 500 receives measurement datum from MMU 516 via a communication component 544. In one or more embodiments, communication component 544 may be a transceiver. For example, and without limitation, communication component 544 may include an isoSPI communications interface.

In one or more embodiments, controller 512 of PMU 500 is configured to identify an operating condition of battery module 508 as a function of measurement datum. For the purposes of this disclosure, an "operating condition" is a state and/or working order of a battery pack and/or any components thereof. For example, and without limitation, an operating condition may include a state of charge (SOC), a depth of discharge (DOD), a temperature reading, a moisture/humidity level, a gas level, a chemical level, or the like. In one or more embodiments, controller 512 of PMU 500 is configured to determine a critical event element if operating condition is outside of a predetermined threshold (also referred to herein as a "threshold"). For the purposes of this disclosure, a "critical event element" is a failure and/or critical operating condition of a battery pack and/or components thereof that may be harmful to the battery pack and/or corresponding electric aircraft. In one or more embodiments, a critical event element may include an overcurrent, undercurrent, overvoltage, overheating, high moisture levels, byproduct presence, low SOC, high DOD, or the like. For instance, and without limitation, if an identified operating condition, such as a temperature reading of 50° F., of a battery cell of battery pack 504, is outside of a predetermined threshold, such as 75° F. to 90° F., where 75° F. is the temperature threshold and 90° F. is the upper temperature threshold, then a critical event element is determined by controller 512 of PMU 500 since 50° F. is beyond the lower temperature threshold. In another example, and without limitation, PMU 500 may use measurement datum from MMU 516 to identify a temperature of 95° F. for a battery module terminal. If the predetermined threshold is, for example, 90° F., then the determined operating condition exceeds the predetermined threshold, and a critical event element is determined by controller 512, such as a risk of a short at the terminal of a battery module 504. As used in this disclosure, a "predetermined threshold" is a limit and/or range of an acceptable quantitative value and/or combination of values such as an n-tuple or function such as linear function of values, and/or representation related to a normal operating condition of a battery pack and/or components thereof. In one or more embodiments, an operating condition outside of the threshold is a critical operating condition that indicates that a battery pack is malfunctioning, which triggers a critical event element. An operating condition within the threshold is a normal operating condition that indicates that battery pack is working properly and that no action is required by PMU 500 and/or a user. For example, and without limitation, if an operating condition of temperature exceeds a predetermined threshold, as described above in this disclosure, then a battery pack is considered to be operating at a critical operating condition and may be at risk of overheating and experiencing a catastrophic failure.

In one or more embodiments, controller 512 of PMU 500 is configured to generate an action command if critical event element is determined by controller 512. For the purposes of this disclosure, an "action command" is a control signal generated by a controller that provides instructions related to reparative action needed to prevent and/or reduce damage to a battery back, components thereof, and/or aircraft as a result of a critical operating condition of the battery pack. Continuing the previously described example above, if an identified operating condition includes a temperature of 95° F., which exceeds predetermined threshold, then controller 512 may determine a critical event element indicating that battery pack 504 is working at a critical temperature level and at risk of catastrophic failure, such as short circuiting or catching fire. In one or more embodiments, critical event elements may include high shock/drop, overtemperature, undervoltage, high moisture, contactor welding, SOC unbalance, and the like. In one or more embodiments, an action command may include an instruction to terminate power supply from battery pack 504 to electric aircraft, power off battery pack 504, terminate a connection between one or more battery cells 504, initiate a temperature regulating system, such as a coolant system or opening of vents to circulate air around or through battery pack 504, or the like. In one or more embodiments, controller 512 may conduct reparative procedures via action command after determining critical even element to reduce or eliminate critical element event. For example, and without limitation, controller 512 may initiate reparative procedure of a circulation of a coolant through a cooling system of battery pack 504 to lower the temperature if a battery module if the determined temperature of the battery module exceeds a predetermined threshold. In another example, and without limitation, if a gas and/or chemical accumulation level is detected that is then determined to exceed a predetermined threshold, then high voltage disconnect may terminate power supply connection 512. According to some embodiments, a vent of battery pack 504 may be opened to circulate air through battery pack 504 and reduce detected gas levels. Additionally, vent of battery module 504 may have a vacuum applied to aid in venting of ejecta. Vacuum pressure differential may range from 0.1"Hg to 36"Hg.

In one or more embodiments, a critical event alert may be generated by controller 512 of PMU 500 in addition to an action command. The critical event alert may include a lockout feature, which is an alert that remains even after rebooting of the battery pack and/or corresponding systems. Lockout feature may only be removed by a manual override or once the critical event element has ceased and is no longer determined by controller 512. In one or more embodiments, controller 512 may continuously monitor battery pack 504 and components thereof so that an operating condition is known at all times.

In one or more embodiments, controller 512 may include a computing device, which may be implemented in any manner suitable for implementation of a computing device as described in this disclosure, a microcontroller, a logic device, a central processing unit (CPU), a microprocessor, a digital signal processor (DSP), an application specific integrated circuit (ASIC), a control circuit, a combination thereof, or the like. In one or more embodiments, output signals from various components of battery pack 504 may be analog or digital. Controller 512 may convert output signals from MMU 500, sensor 508, and/or sensors 524,128,132, 136,140 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 500 may run state estimation algorithms. In one or more embodiments, PMU 500 may communicate with MMU 516 and/or sensor 508 via a communication component 544. For example, and without limitation, PMU may communicate with MMU 512 using an isoSPI transceiver.

In one or more embodiments, controller 512 may be designed and/or configured to perform any method, method step, or sequence of method steps in any embodiment described in this disclosure, in any order and with any degree of repetition. For instance, controller 512 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 512 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring again to FIG. 5, PMU 500 may include a memory component 520 configured to store data related to battery pack 504 and/or components thereof. In one or more embodiments, memory component 520 may store battery pack data. Battery pack data may include generated data, detected data, measured data, inputted data, determined data and the like. For example, measurement datum from MMU 512 and or a sensor may be stored in memory component 520. In another example, critical event element and/or corresponding lockout flag may be stored in memory component 520. Battery pack data may also include inputted datum, which may include total flight hours that battery pack 504 and/or electric aircraft, such as electric aircraft 508, have been operating, flight plan of electric aircraft, battery pack identification, battery pack verification, a battery pack maintenance history, battery pack specifications, or the like. In one or more embodiments, battery pack maintenance history may include mechanical failures and technician resolutions thereof, electrical failures and technician resolutions thereof. In one or more embodiments, memory component 520 may be communicatively connected to sensors, such as sensor 508, that detect, measure, and obtain a plurality of measurements, which may include current, voltage, resistance, impedance, coulombs, watts, temperature, moisture/humidity, or a combination thereof. Additionally or alternatively, memory component 520 may be communicatively connected to a sensor suite consistent with this disclosure to measure physical and/or electrical characteristics. In one or more embodiments, memory component 520 may store the battery pack data that includes a predetermined threshold consistent with this disclosure. The moisture-level threshold may include an absolute, relative, and/or specific moisture-level threshold. Battery pack 504 may be designed to the Federal Aviation Administration (FAA)'s Design Assurance Level A (DAL-A), using redundant DAL-B subsystems.

In one or more embodiments, memory component 520 may be configured to save measurement datum, operating condition, critical event element, and the like periodically in regular intervals to memory component 520. "Regular intervals", for the purposes of this disclosure, refers to an event taking place repeatedly after a certain amount of elapsed time. In one or more embodiments, PMU 500 may include a timer that works in conjunction to determine regular intervals. In other embodiments, PMU may continuously update operating condition or critical event element and, thus, continuously store data related the information in memory component. A Timer may include a timing circuit, internal clock, or other circuit, component, or part configured to keep track of elapsed time and/or time of day. For example, in non-limiting embodiments, data storage system 520 may save the first and second battery pack data every 30 seconds, every minute, every 30 minutes, or another time period according to timer. Additionally or alternatively, memory component 520 may save battery pack data after certain events occur, for example, in non-limiting embodiments, each power cycle, landing of the electric aircraft, when battery pack is charging or discharging, a failure oof battery module, a malfunction of battery module, a critical event element, or scheduled maintenance periods. In non-limiting embodiments, battery pack 504 phenomena may be continuously measured and stored at an intermediary storage location, and then permanently saved by memory component 520 at a later time, like at a regular interval or after an event has taken place as disclosed hereinabove. Additionally or alternatively, data storage system may be configured to save battery pack data at a predetermined time. "Predetermined time", for the purposes of this disclosure, refers to an internal clock within battery pack commanding memory component 520 to save battery pack data at that time.

Memory component 520 may include a solid-state memory or tape hard drive. Memory component 520 may be communicatively connected to PMU 500 and may be configured to receive electrical signals related to physical or electrical phenomenon measured and store those electrical signals as battery module data. Alternatively, memory component 520 may be a plurality of discrete memory components that are physically and electrically isolated from each other. One of ordinary skill in the art would understand the virtually limitless arrangements of data stores with which battery pack 504 could employ to store battery pack data.

In one or more embodiments, PMU 500 may be configured to communicate with an electric aircraft, such as a flight controller of electric aircraft, using a controller area network (CAN), such as by using a CAN transceiver 576. In one or more embodiments, controller area network may include a bus. Bus may include an electrical bus. Bus may refer to power busses, audio busses, video busses, computing address busses, and/or data busses. Bus may be additionally or alternatively responsible for conveying electrical signals generated by any number of components within battery pack 504 to any destination on or offboard an electric aircraft. PMU 500 may include wiring or conductive surfaces only in portions required to electrically couple bus to electrical power or necessary circuits to convey that power or signals to their destinations. In one or more embodiments, PMU 500 may transmit action command via CAN transceiver 576 and/or an alert to an electric aircraft. For example, and without limitation, PMU 500 may transmit an alert to a user interface, such as a display, of an electric aircraft to indicate to a user that a critical event element has been determined. In one or more embodiments, PMU 500 may also use CAN transceiver 576 to transmit an alert to a remote user device, such as a laptop, mobile device, tablet, or the like.

In one or more embodiments, PMU 500 may include a housing 548. In one or more embodiments, housing 548 may include materials which possess characteristics suitable for thermal insulation, such as fiberglass, iron fibers, polystyrene foam, and thin plastic films, to name a few. Housing 548 may also include polyvinyl chloride (PVC), glass, asbestos, rigid laminate, varnish, resin, paper, Teflon, rubber, and mechanical lamina to physically isolate components of battery pack 504 from external components. In one or more embodiments, housing 548 may also include layers that separate individual components of PMU 500, such as components described above in this disclosure. As understood by one skilled in the art, housing 548 may be any shape or size suitable to attached to a battery module, such as battery module 504 of FIG. 5, of battery pack 504. In one or more embodiments, controller 512, memory component 520, sensor 508, or the like may be at least partially disposed within housing 516.

In one or more embodiments, PMU 500 may be in communication with a high voltage disconnect of battery pack 504. In one or more embodiments, high voltage disconnect may include a bus. A "bus", for the purposes of this disclosure and in electrical parlance is any common connection to which any number of loads, which may be connected in parallel, and share a relatively similar voltage may be electrically coupled. Bus may be responsible for conveying electrical energy stored in battery pack 504 to at least a portion of an electric aircraft, as discussed previously in this disclosure. High voltage disconnect 552 may include a ground fault detection 556, an HV (high voltage) current sense 560, an HV pyro fuse 564, an HV contactor 568, and the like. High voltage disconnect 552 may physically and/or electrically breaks power supply communication between electric aircraft and battery module of battery pack 504. In one or more embodiments, in one or more embodiments, the termination of a power supply connection between high voltage disconnect 552 and electric aircraft may be restored by high voltage disconnect 552 once PMU 500 no longer determined a critical event element. In other embodiments, a power supply connection may need to be restored manually, such as by a user. In one or more embodiments, PMU 500 may also include a switching regulator, which is configured to receive power from a battery module of battery pack 504. Thus, PMU 500 may be powered by energy by battery pack 504.

Figure 6:
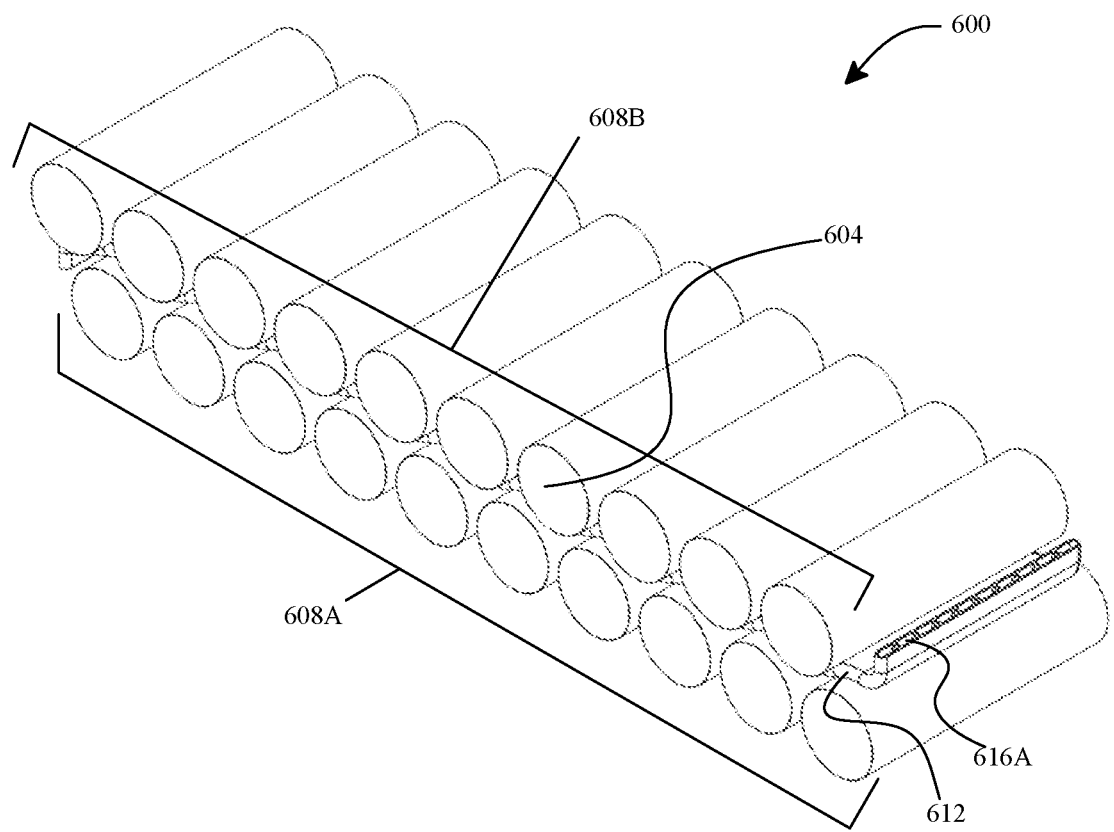
FIG. 6 is an illustration of an exemplary embodiment of a battery unit.

Referring now to FIG. 6, an exemplary embodiment of a battery unit 600 is illustrated. Battery unit 600 may be consistent with any battery unit as described herein. Battery unit 600 may be configured to couple to one or more other battery units, wherein the combination of two or more battery units 600 forms at least a portion of battery module as described herein. In a non-limiting embodiment, battery unit 600 may be configured to include a plurality of battery cells 604. The plurality of battery cells 604 may include any battery cell as described in the entirety of this disclosure. In the instant embodiment, for example and without limitation, battery unit 600 includes a first row 608A of battery cells 604, wherein first row 608A of battery cells 604 is in contact with the first side of the thermal conduit, as described in further detail below. As a non-limiting example, row 608A of battery cells 604 may be configured to contain ten columns of battery cells. Further, in the instant embodiment, for example and without limitation, battery unit 600 includes a second row 608B of battery cells 604, wherein second row 608B of battery cells 604 is in contact with the second side of the thermal conduit, as described in further detail below. As a non-limiting example, second row 608B of battery cells 604 may be configured to contain ten columns of battery cells. In the embodiment of FIG. 6, battery unit 600 may be configured to contain twenty battery cells 604 in first row 608A and second row 608B. Battery cells 604 of battery unit 600 may be arranged in any configuration, such that battery unit 600 may contain any number of rows of battery cells and any number of columns of battery cells. Though the illustrated embodiment of FIG. 6 present one arrangement for battery unit 600, one of skill in the art will understand that any number of arrangements may be used. In embodiments, battery unit 600 may contain any offset of distance between first row 608A of battery cells 604 and second row 608B of battery cells 604, wherein the battery cells 604 of first row 608A and the battery cells 604 of second row 608B are not centered with each other. In the instant embodiment, for example and without limitation, battery unit 600 includes first row 608A and adjacent second row 608B each containing ten battery cells 604, each battery cell 604 of first row 608A and each battery cell 604 of second row 608B are shifted a length measuring the radius of a battery cell, wherein the center of each battery cell 604 of first row 608A and each battery cell 604 of second row 608B are separated from the center of the battery cell in the adjacent column by a length equal to the radius of the battery cell. As a further example and without limitation, each battery cell of 604 of first row 608A and each battery cell 604 of second row 608B are shifted a length measuring a quarter the diameter of each battery cell, wherein the center of each battery cell of first row 608A and each battery cell of second row 608B are separated from the center of a battery cell in the adjacent column by a length equal to a quarter of the diameter of the battery cell. First row 608A of battery cells 604 and second row 608B of battery cells 604 of the at least a battery unit 116 may be configured to be fixed in a position by utilizing a cell retainer, as described in the entirety of this disclosure. The arrangement of the configuration of each battery cell 604 of first row 608A and each battery cell 604 of second row 608B of battery unit 600 in FIG. 6 is a non-limiting embodiment and in no way precludes other arrangements of each battery cell 604 of first row 608A and/or second row 608B. Each battery cell 604A-B may be connected utilizing any means of connection as described in the entirety of this disclosure. Persons skilled in the art, upon reviewing the entirety of this disclosure, will be aware of electrical connections that may be used as to connect each battery cell consistently with this disclosure.

Still referring to FIG. 6, in embodiments, battery unit 600 can include thermal conduit 612, wherein thermal conduit 612 has a first surface and a second opposite and opposing surface. Thermal conduit 612 may include any thermal conduit as described above in further detail in reference to FIGS. 1-3. The height of thermal conduit 612 may not exceed the height of battery cells 604, as described in the entirety of this disclosure. For example and without limitation, in the embodiment of FIG. 6, the thermal conduit 612 is at a height that is equal to the height of each battery cell 604 of first row 608A and second row 608B. Thermal conduit 612 may be consistent with any thermal conduit as described herein. Thermal conduit 612 may be configured to include an indent in the component for each battery cell 604 coupled to the first surface and/or the second surface of thermal conduit 612. Persons skilled in the art, upon reviewing the entirety of this disclosure, will be aware of components that may be used as thermal conduits consistently with this disclosure.

With continued reference to FIG. 6, thermal conduit 612, in embodiments, includes at least a passage 616, wherein the at least a passage 616 comprises an opening starting at the first end of thermal conduit 612 and terminating at a second, opposing end of thermal conduit 612. The "passage", as described herein, is a horizontal channel with openings on each end of the thermal conduit. The at least a passage 616 may be configured to have a hollow shape comprising one or more sides, at least two ends (e.g. a top and a bottom), and a length, wherein the hollow shape comprises a void having a shape the same as or different from the shape of the at least a passage 616 and terminating at an opposite, opposing second end of the shape. For example and without limitation, in the illustrative embodiment of FIG. 6, the at least a passage 616 comprise a rectangle shaped tubular shape. In embodiments, the tubular component runs effectively perpendicular to each battery cell 604. In embodiments, the at least a passage 616 can be disposed such that it forms a void originating at a first side of the battery module and terminating at the second, opposite, and opposing side, of the battery module. According to embodiments, the at least a passage 616 and/or thermal conduit 612 may be composed utilizing any suitable material. For example and without limitation, thermal conduit 612 and/or the at least a passage 616 may be composed of polypropylene, polycarbonate, acrylonitrile butadiene styrene, polyethylene, nylon, polystyrene, polyether ether ketone, and the like.

Continuing to refer to FIG. 6, in embodiments, the at least a passage 616 may be disposed in the thermal conduit 612 such that the at least a passage may be configured to allow the travel of a media from a first end of thermal conduit 612 to the second, opposite, and opposite end of thermal conduit 612. For example, the at least a passage 616 can be disposed to allow the passage of the media through the hollow opening/void of the at least a passage 616. The media may include any media as described in the entirety of this disclosure. The hollow opening of thermal conduit 612 and/or the at least a passage 616 may be configured to be of any size and/or diameter. For example and without limitation, the hollow opening of the at least a passage 616 may be configured to have a diameter that is equal to or less than the radius of each battery cell 604. The at least a passage 616 and/or thermal conduit 612 may have a length equal or less than the length of one row of battery cells 604 such that thermal conduit and/or the at least a passage may be configured to not exceed the length of first row 608A an/or second row 608B of battery cells 604. The opening of the at least a passage 616 can be configured to be disposed at each end of thermal conduit 612, wherein the at least a passage 616 may be in contact with each battery cell 604 in a respective battery unit 600 located at the end of each column and/or row of the battery unit 600. For example and without limitation, in the illustrative embodiment of FIG. 6, a battery unit 600 can contain two rows with ten columns of battery cells 604 and the opening of the at least a passage 616 on each end of thermal conduit 612 that is in contact with a respective battery cell 604 at the end of each of the two columns. Persons skilled in the art, upon reviewing the entirety of this disclosure, will be aware of various components that may be used as at least a passage consistently with this disclosure.

Figure 7:
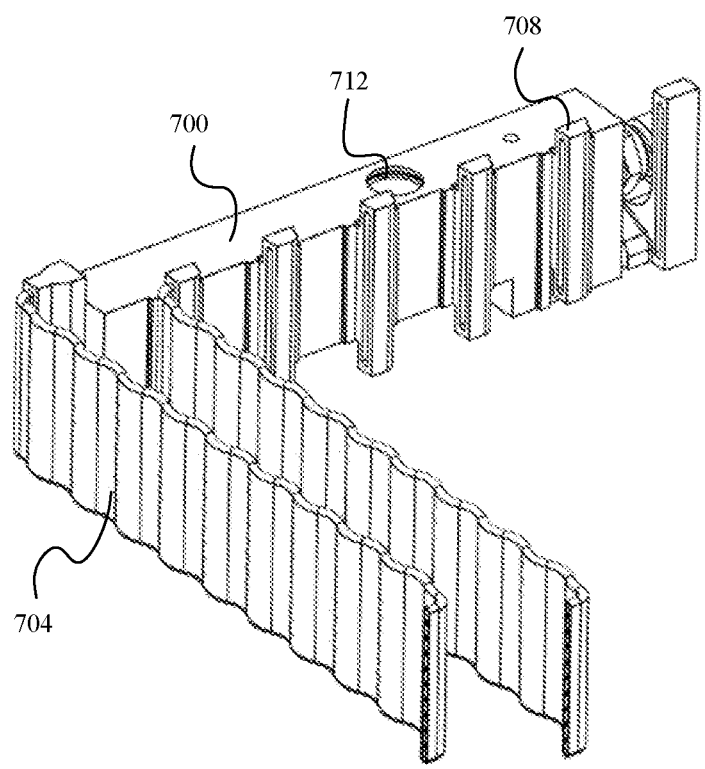
FIG. 7 is an illustration of a thermal circuit coupled to a thermal conduit.

Referring now to FIG. 7, an embodiment of a thermal circuit 700 coupled to thermal conduit 704 is illustrated. The configuration of circuit 700 and thermal conduit 704 is merely exemplary and should in no way be considered limiting. Circuit 700 and/or thermal conduit 704 may be configured to facilitate the flow of the media through each battery module of the plurality of battery modules to cool the battery pack. The media may include any media as described in further detail in the entirety of this disclosure. Circuit 700 can include any circuit as described herein. In the embodiment, circuit 700 may be configured to couple to the first end of thermal conduit 704, wherein coupling may be configured to facilitate the flow of the media from the circuit 700 to the first end of thermal conduit 704 through the at least a passage. The embodiment of FIG. 7 illustrates one configuration of circuit 700 coupled to thermal conduit 704, however this is non-limiting and may include circuit 700 coupled to thermal conduit 704 in any configuration. Coupling may include any coupling as described in further detail throughout the entirety of this disclosure. Circuit 700 may include any component configured to facilitate the flow of media to the battery pack by utilizing an electrical current. For example and without limitation, circuit 700 may include a printed circuit board, wherein the printed circuit board mechanically supports the electrical connection facilitating the flow of media to the battery pack. Circuit 700 may be configured to include first end 708 and a second end, wherein the second end is opposite the first end of circuit 700. In the illustrated embodiment of FIG. 7, first end 708 of circuit 700 is in a plane perpendicular to the longitudinal axis of thermal conduit 704. First end 708 of circuit 700 may be configured to include media feed 712. The embodiment of circuit 700 illustrates media feed 712 disposed only on first side 708 of circuit 700, however this is non-limiting and circuit 700 may include media feed 712 disposed on the second end of circuit 700. The media feed component of circuit 700 may be configured to allow the media to feed into circuit 700, the battery module and/or the battery pack, wherein the flow of media is initiated as a function of coupling media feed 712 of circuit 700 to the media feeder of the thermal management apparatus. Media feed 712 can include any media feed as described herein. In the illustrated embodiment of FIG. 7, media feed 712 is a threaded hole, wherein the media feeder of the thermal management apparatus may be configured to couple to the threaded hole of media feed 712, however this is non-limiting and media feed component may include, without limitation, a magnetic component, a latching mechanism, a pressure fit tubing mechanism, a nozzle mechanism, a hole, a flap, and the like. Alternatively of additionally, media feed 712 may be configured connect with other media feeds of a plurality of battery modules stacked adjacent to each other. Persons skilled in the art, upon reviewing the entirety of this disclosure, will be aware of the various embodiments, connections, and configurations for purposes as described herein.

Continuing to refer to FIG. 7, thermal conduit 704 can include any thermal conduit as described in further detail above in reference to FIGS. 1-4. The height of thermal conduit 704 may not exceed the height of each battery cell of the plurality of battery cells, as described in the entirety of this disclosure. Thermal conduit 704 may be composed of any suitable material, as described above in further detail in reference to FIGS. 1-4. Thermal conduit 704 may be configured to include any curvature of the first side and/or second side of thermal conduit 704. For example and without limitation the curvature of the first side and/or second side of thermal conduit 704 correlates at least a portion of a battery cell of the plurality of battery cells. As a further example and without limitation, in an embodiment, thermal conduit 704 may be configured to include ten curves of the first surface of thermal conduit, wherein each curve may be configured to contain the at least a portion of each battery cell of the plurality of battery cells adjacent to the first surface of thermal conduit 704. As a further example and without limitation, in the embodiment of FIG. 7, thermal conduit 704 may be configured to include ten curves on the second surface of thermal conduit 704 wherein each curve may be configured to contain the at least a portion of each battery cell of the plurality of battery cells adjacent to the second surface of thermal conduit 704. The embodiment of thermal conduit 704 illustrates ten curves on each surface of thermal conduit 704, however this is non-limiting and thermal conduit may include any number of curves on each surface of thermal conduit 704, wherein each curve corresponds to the at least a portion of a battery cell of the plurality of battery cells.

Figure 8:
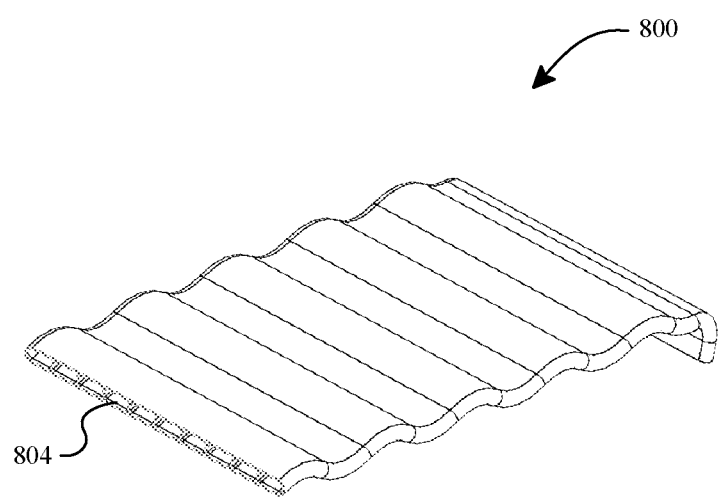
FIG. 8 is a cross-sectional illustration of a thermal conduit.

Referring now to FIG. 8, a cross-sectional view of thermal conduit 800 is presented. Thermal conduit 800 can include any thermal conduit as described in further detail above in reference to FIGS. 1-5. As described in further detail above in reference to FIGS. 1-5, thermal conduit 800 may be composed of any suitable material. Further, thermal conduit 800 may be configured to include any curvature of the first side and/or second side of the thermal conduit 800, as described herein. Thermal conduit 800 is configured to at least a passage 804. The at least a passage 804 can include any at least a passage as described herein. The at least a passage 804 is configured to have a hollow shape comprising one or more sides, at least two ends (e.g. a top and a bottom), and a length, wherein the hollow shape comprises a void having a shape the same as or different from the shape of the at least a passage 804 and terminating at an opposite, opposing second end of the shape, as described herein. For example and without limitation, in the illustrative embodiment of FIG. 8, the at least a passage 804 comprise a rectangle shaped tubular shape. In embodiments, the tubular component runs effectively perpendicular to each battery cell and/or curvature of thermal conduit 800 configured to house each battery cell. In embodiments, the at least a passage 804 can be disposed such that it forms a void originating at a first side of the battery module and terminating at the second, opposite, and opposing side, of the battery module, as described in further detail in the entirety of this disclosure. According to embodiments, the at least a passage 804 and/or thermal conduit 800 may be composed utilizing any suitable material, as described herein. In embodiments, the at least a passage 804 may be disposed in the thermal conduit 800 such that the at least a passage is configured to allow the travel of a media from a first end of thermal conduit 800 to the second, opposite, and opposite end of thermal conduit 800, as described in further detail in the entirety of this disclosure.

Figure 9:
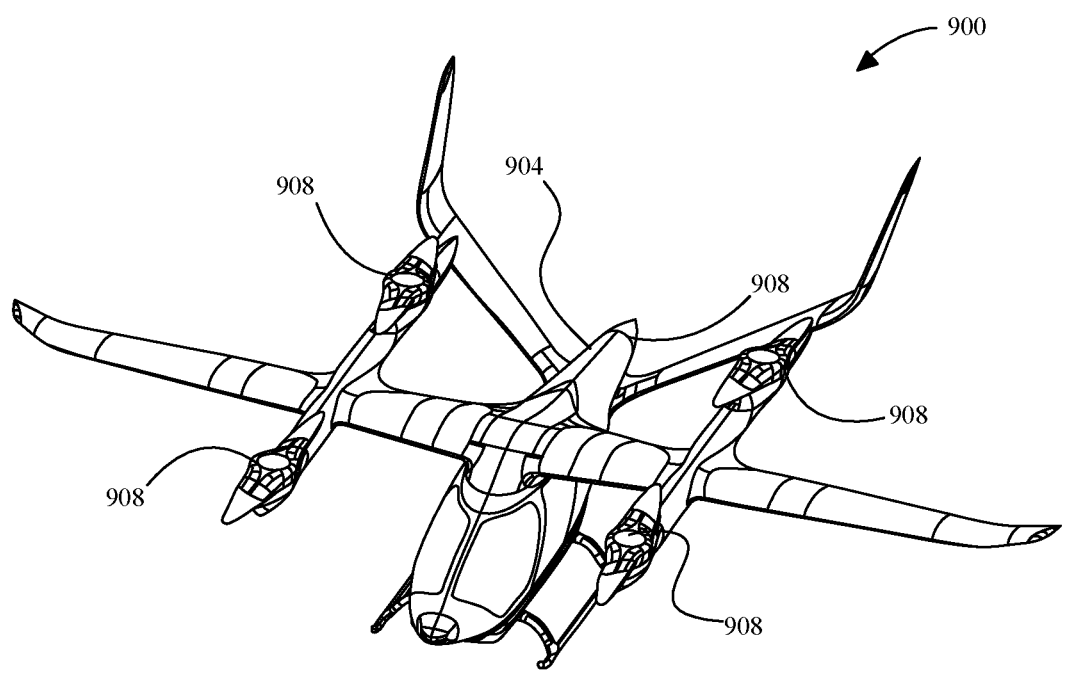
FIG. 9 is an illustration of an exemplary embodiment of an electric aircraft.

Referring now to FIG. 9, an exemplary embodiment of an electric aircraft 900 is illustrated. Electric aircraft 900 may be consistent with aircraft 104. In an embodiment, electric aircraft 900 is an electric aircraft. As used in this disclosure an "aircraft" is any vehicle that may fly by gaining support from the air. In some embodiments, electric aircraft 900 is manned by a pilot seated inside electric aircraft 900. In a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Electric aircraft 900 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 9, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel electric aircraft 900, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

Still referring to FIG. 9, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 904 may include structural elements that physically support a shape and structure of an aircraft. Structural elements may take a plurality of forms, alone or in combination with other types. Structural elements may vary depending on a construction type of aircraft such as without limitation a fuselage 904. Fuselage 904 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 9, aircraft fuselage 904 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 904 orthogonal to a longitudinal (nose to tail) axis of the aircraft and may form a general shape of fuselage 904. A former may include differing cross-sectional shapes at differing locations along fuselage 904, as the former is the structural element that informs the overall shape of a fuselage 904 curvature. In embodiments, aircraft skin may be anchored to formers and strings such that the outer mold line of a volume encapsulated by formers and stringers includes the same shape as electric aircraft 900 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

Still referring to FIG. 9, electric aircraft 900 may include a plurality of flight components 908. As used in this disclosure a "flight component" is a component that promotes flight and guidance of an aircraft. In an embodiment, flight component 908 may be mechanically coupled to an aircraft. Plurality of flight components 908 may include flight component 108. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 9, plurality of flight components 908 may include at least a landing gear. The landing gear may be consistent with any landing gear as described in the entirety of this disclosure. In another embodiment, plurality of flight components 908 may include at least a propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 9, plurality of flight components 908 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 9, plurality of flight components 908 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1045 N to force aircraft to in a horizontal direction along the longitudinal axis. As a further non-limiting example, pusher component may twist and/or rotate to pull air behind it and, at the same time, push electric aircraft 900 forward with an equal amount of force. In an embodiment, and without limitation, the more air forced behind aircraft, the greater the thrust force with which electric aircraft 900 is pushed horizontally will be. In another embodiment, and without limitation, forward thrust may force electric aircraft 900 through the medium of relative air. Additionally or alternatively, plurality of flight components 908 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 10:
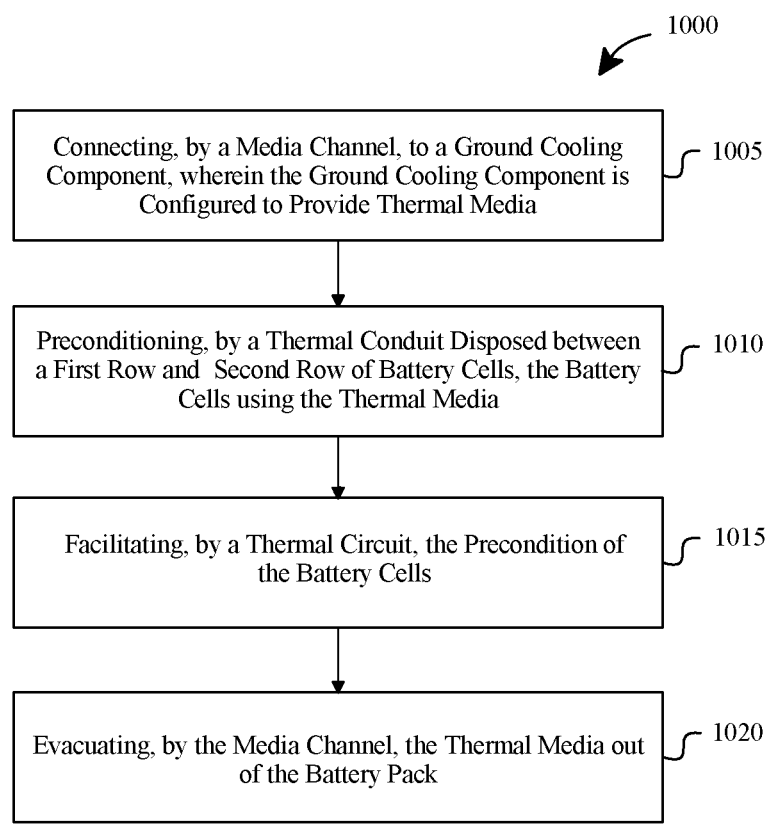
FIG. 10 is a flow diagram of an exemplary embodiment of a method for a ground-based battery management for an electric aircraft.

Now referring to FIG. 10, a flow diagram of an exemplary embodiment of a method 1000 for ground-based battery management for an electric aircraft is illustrated. At step 1005, method 1000 includes connecting, by a media channel encompassing a battery pack, to a ground cooling component, wherein the ground cooling component is configured to provide thermal media. The media channel may include any media channel as described herein. The ground cooling component may include any ground cooling component as described herein. The thermal media may include any thermal media as described herein. In a non-limiting embodiment, method 1000 may include receiving, by a media feed of the media channel, the thermal media from the ground cooling component. The media feed may include any media feed as described herein. Persons skilled in the art, upon reviewing the entirety of this disclosure, will be aware of the various methods of receiving and transferring thermal media for purposes as described herein.

Still referring to FIG. 10, at step 1010, method 1000 includes preconditioning, by a thermal conduit disposed between a first row and a second row of battery cells, the battery cells using the thermal media. The thermal conduit may include any thermal conduit as described herein. In a non-limiting embodiment, method 1000 may include preconditioning using a computing device communicatively connected to the electric aircraft and the battery pack. The computing device may include any computing device as described herein. In another non-limiting embodiment, the thermal conduit is in direct contact with at least a portion of the battery cells of the first row and at least a portion of the battery cells of the second row. The thermal conduit comprises two opposing surfaces wherein at least a portion of each battery cell of the first row is in direct contact with a first opposing surface of the thermal conduit and at least a portion of each battery cell of the second row is in contact with a second opposing surface of the conduit. In a non-limiting embodiment, method 1000 may include providing, by a supplemental thermal component mechanically coupled to the thermal conduit, the thermal media to the thermal conduit inflight. The supplemental thermal component may include any supplemental thermal component as described herein. Persons skilled in the art, upon reviewing the entirety of this disclosure, will be aware of the various methods of preconditioning in the context of battery management.

Still referring to FIG. 10, at step 1015, method 1000 includes facilitating, by a thermal circuit mechanically coupled to the thermal conduit the precondition of the battery cells. The thermal circuit may include any thermal circuit as described herein. In a non-limiting embodiment, method 1000 may include facilitating, by a first circuit mechanically coupled to a first end of the thermal conduit, the precondition of a first portion of battery cells and facilitating, by a second circuit mechanically coupled to an opposite second end of the thermal conduit, the precondition of a second portion of battery cells. In a non-limiting embodiment, method 1000 may include facilitating, by cowl flaps mechanically coupled to the media channel, the preconditioning of the battery cells using airflow. In another non-limiting embodiment, method 1000 includes minimizing, by the thermal conduit, the temperature gradient across each battery cell. Persons skilled in the art, upon reviewing the entirety of this disclosure, will be aware of the various methods of facilitating heat transfer in the context of preconditioning.

Still referring to FIG. 10, at step 1020, method 1000 includes evacuating, by the media channel, the thermal media out of the battery pack and the electric aircraft. Evacuating may include evacuating, by a media exhaust of the media channel, the thermal media out of the battery pack and the electric aircraft. The media exhaust may include any media exhaust as described herein. In some embodiments, method 1000 may include performing a thermal media discharge check and executing a discharge precondition corrective action as a function of the thermal media discharge check. The thermal media discharge check may include any thermal media discharge check as described herein. the discharge precondition corrective action may include any discharge precondition corrective action as described herein. Persons skilled in the art, upon reviewing the entirety of this disclosure, will be aware of the various methods and processes of circulating air and heat transfer in the context of corrective actions.

Figure 11:
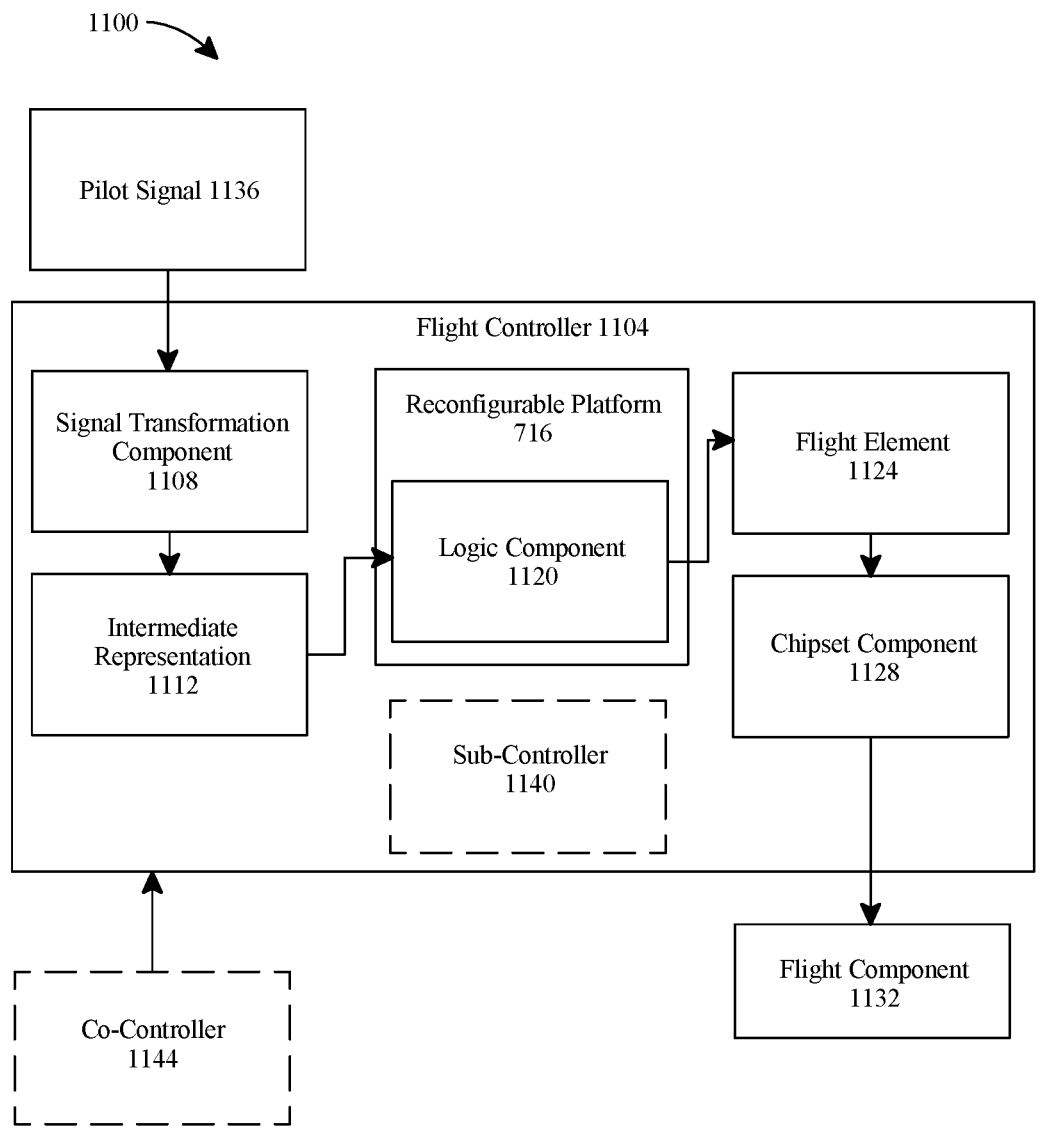
FIG. 11 is a block diagram of an exemplary embodiment of a flight controller.

Now referring to FIG. 11, an exemplary embodiment 1100 of a flight controller 1104 is illustrated. Flight controller 1104 may be consistent with any flight controller as described herein. As used in this disclosure a "flight controller" is a computing device of a plurality of computing devices dedicated to data storage, security, distribution of traffic for load balancing, and flight instruction. Flight controller 1104 may include and/or communicate with any computing device as described in this disclosure, including without limitation a microcontroller, microprocessor, digital signal processor (DSP) and/or system on a chip (SoC) as described in this disclosure. Further, flight controller 1104 may include a single computing device operating independently, or may include two or more computing device operating in concert, in parallel, sequentially or the like; two or more computing devices may be included together in a single computing device or in two or more computing devices. In a non-limiting embodiment, system 110 may include a computing device wherein the computing device may include flight controller 1104 configured to facilitate communication between a plurality of aircrafts and their flight controllers. In embodiments, flight controller 1104 may be installed in an aircraft, may control the aircraft remotely, and/or may include an element installed in the aircraft and a remote element in communication therewith. In some embodiments, flight controller 1104 may be configured to generate a node as described in FIG. 1.

In an embodiment, and still referring to FIG. 11, flight controller 1104 may include a signal transformation component 1108. As used in this disclosure a "signal transformation component" is a component that transforms and/or converts a first signal to a second signal, wherein a signal may include one or more digital and/or analog signals. For example, and without limitation, signal transformation component 1108 may be configured to perform one or more operations such as preprocessing, lexical analysis, parsing, semantic analysis, and the like thereof. In an embodiment, and without limitation, signal transformation component 1108 may include one or more analog-to-digital convertors that transform a first signal of an analog signal to a second signal of a digital signal. For example, and without limitation, an analog-to-digital converter may convert an analog input signal to a 11-bit binary digital representation of that signal. In another embodiment, signal transformation component 1108 may include transforming one or more low-level languages such as, but not limited to, machine languages and/or assembly languages. For example, and without limitation, signal transformation component 1108 may include transforming a binary language signal to an assembly language signal. In an embodiment, and without limitation, signal transformation component 1108 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 11, signal transformation component 1108 may be configured to optimize an intermediate representation 1112. As used in this disclosure an "intermediate representation" is a data structure and/or code that represents the input signal. Signal transformation component 1108 may optimize intermediate representation as a function of a data-flow analysis, dependence analysis, alias analysis, pointer analysis, escape analysis, and the like thereof. In an embodiment, and without limitation, signal transformation component 1108 may optimize intermediate representation 1112 as a function of one or more inline expansions, dead code eliminations, constant propagation, loop transformations, and/or automatic parallelization functions. In another embodiment, signal transformation component 1108 may optimize intermediate representation as a function of a machine dependent optimization such as a peephole optimization, wherein a peephole optimization may rewrite short sequences of code into more efficient sequences of code. Signal transformation component 1108 may optimize intermediate representation to generate an output language, wherein an "output language," as used herein, is the native machine language of flight controller 1104. For example, and without limitation, native machine language may include one or more binary and/or numerical languages.

In an embodiment, and still referring to FIG. 11, flight controller 1104 may include a reconfigurable hardware platform 1116. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 1116 may be reconfigured to enact any algorithm and/or algorithm selection process received from another computing device and/or created using machine-learning processes.

Still referring to FIG. 11, reconfigurable hardware platform 1116 may include a logic component 1120. As used in this disclosure a "logic component" is a component that executes instructions on output language. For example, and without limitation, logic component may perform basic arithmetic, logic, controlling, input/output operations, and the like thereof. Logic component 1120 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 1120 may be organized according to Von Neumann and/or Harvard architecture as a non-limiting example. Logic component 1120 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 1120 may include one or more integrated circuit microprocessors, which may contain one or more central processing units, central processors, and/or main processors, on a single metal-oxide-semiconductor chip. Logic component 1120 may be configured to execute a sequence of stored instructions to be performed on the output language and/or intermediate representation 1112. Logic component 1120 may be configured to fetch and/or retrieve the instruction from a memory cache, wherein a "memory cache," as used in this disclosure, is a stored instruction set on flight controller 1104. Logic component 1120 may be configured to decode the instruction retrieved from the memory cache to opcodes and/or operands. Logic component 1120 may be configured to execute the instruction on intermediate representation 1112 and/or output language. For example, and without limitation, logic component 1120 may be configured to execute an addition operation on intermediate representation 1112 and/or output language.

In an embodiment, and without limitation, logic component 1120 may be configured to calculate a flight element 1124. As used in this disclosure a "flight element" is an element of datum denoting a relative status of aircraft. For example, and without limitation, flight element 1124 may denote one or more torques, thrusts, airspeed velocities, forces, altitudes, groundspeed velocities, directions during flight, directions facing, forces, orientations, and the like thereof. For example, and without limitation, flight element 1124 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 1124 may denote that aircraft is following a flight path accurately and/or sufficiently.

In an embodiment, and still referring to FIG. 11, flight controller 1104 may be configured generate an autonomous function. As used in this disclosure an "autonomous function" is a mode and/or function of flight controller 1104 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 1124. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 1104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 1104 will control the ailerons and/or rudders. As used in this disclosure "non-autonomous mode" is a mode that denotes a pilot will control aircraft and/or maneuvers of aircraft in its entirety.

In an embodiment, and still referring to FIG. 11, flight controller 1104 may generate autonomous function as a function of an autonomous machine-learning model. As used in this disclosure an "autonomous machine-learning model" is a machine-learning model to produce an autonomous function output given flight element 1124 and a pilot signal 1136 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 1136 may denote that a pilot is controlling and/or maneuvering ailerons, wherein the pilot is not in control of the rudders and/or propulsors. In an embodiment, pilot signal 1136 may include an implicit signal and/or an explicit signal. For example, and without limitation, pilot signal 1136 may include an explicit signal, wherein the pilot explicitly states there is a lack of control and/or desire for autonomous function. As a further non-limiting example, pilot signal 1136 may include an explicit signal directing flight controller 1104 to control and/or maintain a portion of aircraft, a portion of the flight plan, the entire aircraft, and/or the entire flight plan. As a further non-limiting example, pilot signal 1136 may include an implicit signal, wherein flight controller 1104 detects a lack of control such as by a malfunction, torque alteration, flight path deviation, and the like thereof. In an embodiment, and without limitation, pilot signal 1136 may include one or more explicit signals to reduce torque, and/or one or more implicit signals that torque may be reduced due to reduction of airspeed velocity. In an embodiment, and without limitation, pilot signal 1136 may include one or more local and/or global signals. For example, and without limitation, pilot signal 1136 may include a local signal that is transmitted by a pilot and/or crew member. As a further non-limiting example, pilot signal 1136 may include a global signal that is transmitted by air traffic control and/or one or more remote users that are in communication with the pilot of aircraft. In an embodiment, pilot signal 1136 may be received as a function of a tri-state bus and/or multiplexor that denotes an explicit pilot signal should be transmitted prior to any implicit or global pilot signal.

Still referring to FIG. 11, autonomous machine-learning model may include one or more autonomous machine-learning processes such as supervised, unsupervised, or reinforcement machine-learning processes that flight controller 1104 and/or a remote device may or may not use in the generation of autonomous function. As used in this disclosure "remote device" is an external device to flight controller 1104. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 11, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 1104 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 11, flight controller 1104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 1104. Remote device and/or FPGA may transmit a signal, bit, datum, or parameter to flight controller 1104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 1104 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 11, flight controller 1104 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 11, flight controller 1104 may include, but is not limited to, for example, a cluster of flight controllers in a first location and a second flight controller or cluster of flight controllers in a second location. Flight controller 1104 may include one or more flight controllers dedicated to data storage, security, distribution of traffic for load balancing, and the like. Flight controller 1104 may be configured to distribute one or more computing tasks as described below across a plurality of flight controllers, which may operate in parallel, in series, redundantly, or in any other manner used for distribution of tasks or memory between computing devices. For example, and without limitation, flight controller 1104 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

Still referring to FIG. 11, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 11, flight controller may include a sub-controller 1140. As used in this disclosure a "sub-controller" is a controller and/or component that is part of a distributed controller as described above; for instance, flight controller 1104 may be and/or include a distributed flight controller made up of one or more sub-controllers. For example, and without limitation, sub-controller 1140 may include any controllers and/or components thereof that are similar to distributed flight controller and/or flight controller as described above. Sub-controller 1140 may include any component of any flight controller as described above. Sub-controller 1140 may be implemented in any manner suitable for implementation of a flight controller as described above. As a further non-limiting example, sub-controller 1140 may include one or more processors, logic components and/or computing devices capable of receiving, processing, and/or transmitting data across the distributed flight controller as described above. As a further non-limiting example, sub-controller 1140 may include a controller that receives a signal from a first flight controller and/or first distributed flight controller component and transmits the signal to a plurality of additional sub-controllers and/or flight components.

Still referring to FIG. 11, flight controller may include a co-controller 1144. As used in this disclosure a "co-controller" is a controller and/or component that joins flight controller 1104 as components and/or nodes of a distributer flight controller as described above. For example, and without limitation, co-controller 1144 may include one or more controllers and/or components that are similar to flight controller 1104. As a further non-limiting example, co-controller 1144 may include any controller and/or component that joins flight controller 1104 to distributer flight controller. As a further non-limiting example, co-controller 1144 may include one or more processors, logic components and/or computing devices capable of receiving, processing, and/or transmitting data to and/or from flight controller 1104 to distributed flight control system. Co-controller 1144 may include any component of any flight controller as described above. Co-controller 1144 may be implemented in any manner suitable for implementation of a flight controller as described above.

In an embodiment, and with continued reference to FIG. 11, flight controller 1104 may be designed and/or configured to perform any method, method step, or sequence of method steps in any embodiment described in this disclosure, in any order and with any degree of repetition. For instance, flight controller 1104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
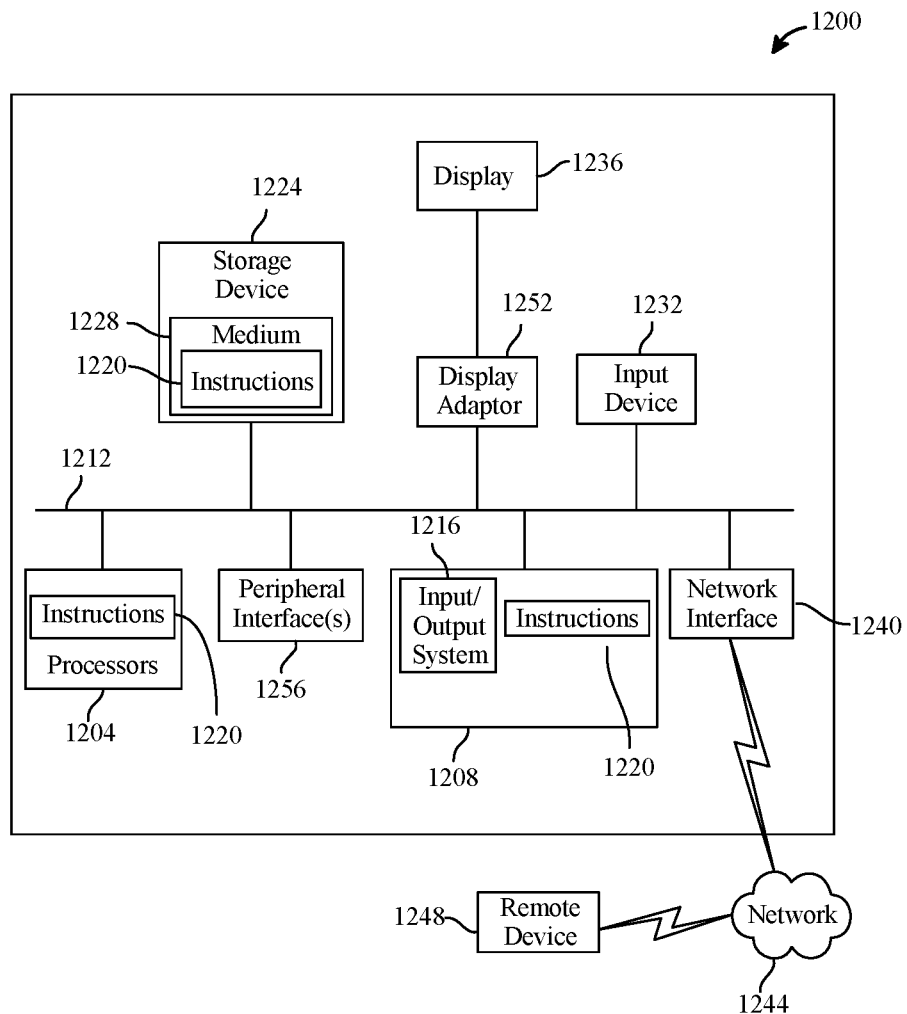
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alphumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a ground-based battery management for an electric aircraft, the apparatus comprising:
    a battery pack mechanically coupled to the electric aircraft, wherein the battery pack comprises:
        at least a battery module, wherein each battery module of the at least a battery module comprises:
            at least a battery unit, wherein each battery unit of the at least a battery unit comprises:
                a first row of battery cells;
                a second row of battery cells; and
                a thermal conduit disposed between the first row and the second row of the battery unit, wherein the thermal conduit is configured to precondition the battery cells; and
            a thermal circuit mechanically coupled to the thermal conduit, wherein the thermal circuit is configured to facilitate the precondition of the battery cells using thermal media; and
    a media channel, communicatively connected to a computing device, encompassing the battery pack and comprising a pressure transducer, wherein the media channel is configured to:
        connect to a ground cooling component, wherein the ground cooling component is configured to provide the thermal media to the thermal circuit using the thermal circuit; and
        evacuate the thermal media out of the battery pack using the thermal circuit wherein the media channel is further configured to generate, as a function of the pressure transducer, pressure data as a function of the flow of evacuated thermal media; and
    the computing device comprising a battery management system, wherein the battery management system is configured to:
        receive a condition parameter as a function of at least a sensor, wherein the condition parameter comprises at least pressure data;
        generate a measurement datum as a function of the condition datum; and
        identify an operating condition of the battery pack as a function of the measurement datum.

2. The apparatus of claim 1, wherein the thermal conduit is in direct contact with at least a portion of the battery cells of the first row and at least a portion of the battery cells of the second row.

3. The apparatus of claim 1, wherein the thermal conduit comprises two opposing surfaces wherein at least a portion of each of battery cell of the first row is in direct contact with a first opposing surface of the thermal conduit and at least a portion of each battery cell of the second row is in contact with a second opposing surface of the conduit.

4. The apparatus of claim 1, wherein the media channel comprises:
    a media feed configured to receive the thermal media from the ground cooling component; and
    a media exhaust configured to evacuate the thermal media out of the battery pack and the electric aircraft.

5. The apparatus of claim 4, wherein the media channel is mechanically coupled to cowl flaps configured to facilitate the precondition of the battery cells using airflow.

6. The apparatus of claim 1, wherein the thermal circuit comprises:
    a first circuit mechanically coupled to a first end of the thermal conduit, wherein the first circuit is configured to facilitate the precondition a first portion of battery cells; and
    a second circuit mechanically coupled to an opposite second end of the thermal conduit, wherein the second circuit is configured to facilitate the precondition of a second portion of battery cells.

7. The apparatus of claim 1, wherein the thermal conduit is mechanically coupled to a supplemental thermal component configured to provide thermal media to the thermal conduit inflight.

8. The apparatus of claim 1, wherein the thermal conduit is further configured to minimize temperature gradient across each battery cell.

9. The apparatus of claim 1, wherein the apparatus is further configured to:
    perform a thermal media discharge check; and
    execute a discharge precondition corrective action as a function of the thermal media discharge check.

10. The apparatus of claim 1, wherein the apparatus further comprises a computing device communicatively connected to the electric aircraft, wherein the computing device is configured to facilitate the precondition of the battery cells.

11. A method of ground-based battery management for an electric aircraft, the method comprising:
    connecting, by a media channel communicatively connected to a computing device encompassing a battery pack and comprising a pressure transducer, to a ground cooling component, wherein the ground cooling component is configured to provide thermal media;
    preconditioning, by a thermal conduit disposed between a first row and a second row of battery cells, the battery cells using the thermal media;
    facilitating, by a thermal circuit mechanically coupled to the thermal conduit, the precondition of the battery cells; and
    evacuating, by the thermal circuit, the thermal media out of the media channel and the battery pack wherein evacuating the thermal media comprises generating as a function of the pressure transducer, pressure data as a function of the flow of evacuated thermal media;
    receiving, by the computing device comprising a pack monitoring system, a condition parameter as a function of at least a sensor, wherein the condition parameter comprises at least pressure data;
    generating, by the computing device comprising the pack monitoring system, a measurement datum as a function of the condition parameter; and
    identifying, by the computing device comprising the pack monitoring system, an operating condition of the battery pack as a function of the measurement datum.

12. The method of claim 11, wherein the thermal conduit is in direct contact with at least a portion of the battery cells of the first row and at least a portion of the battery cells of the second row.

13. The method of claim 11, wherein the thermal conduit comprises two opposing surfaces wherein at least a portion of each of battery cell of the first row is in direct contact with a first opposing surface of the thermal conduit and at least a portion of each battery cell of the second row is in contact with a second opposing surface of the conduit.

14. The method of claim 11, wherein the method further comprises:
receiving, by a media feed of the media channel, the thermal media from the ground cooling component; and
evacuating, by a media exhaust of the media channel, the thermal media out of the battery pack and the electric aircraft.

15. The method of claim 14, wherein the method further comprises facilitating, by cowl flaps mechanically coupled to the media channel, the preconditioning of the battery cells using airflow.

16. The method of claim 11, wherein the method further comprises:
facilitating, by a first circuit mechanically coupled to a first end of the thermal conduit, the precondition of a first portion of battery cells; and
facilitating, by a second circuit mechanically coupled to an opposite second end of the thermal conduit, the precondition of a second portion of battery cells.

17. The method of claim 11, wherein the method further comprises providing, by a supplemental thermal component mechanically coupled to the thermal conduit, the thermal media to the thermal conduit inflight.

18. The method of claim 11, wherein the method further comprises minimizing, by the thermal conduit, the temperature gradient across each battery cell.

19. The method of claim 11, wherein the method further comprises:
performing a thermal media discharge check; and
executing a discharge precondition corrective action as a function of the thermal media discharge check.

20. The method of claim 19, wherein the method further comprises facilitating, as a function of a computing device communicatively connected to the electric aircraft, the precondition of the battery cells.

* * * * *